US00RE35345E

United States Patent [19]

Adami

[11] E Patent Number: Re. 35,345

[45] Reissued Date of Patent: Oct. 1, 1996

[54] MACHINE FOR CREASING AND CUTTING ENDLESS WEBS OF CARDBOARD AND THE LIKE

[75] Inventor: Mauro Adami, Lucca, Italy

[73] Assignee: Foster S.R.L., Lucca, Italy

[21] Appl. No.: 368,534

[22] Filed: Jan. 4, 1995

Related U.S. Patent Documents

Reissue of:

[64] Patent No.: 5,120,297
Issued: Jun. 9, 1992
Appl. No.: 541,302
Filed: Jun. 18, 1990

[30] Foreign Application Priority Data

Jun. 21, 1989 [IT] Italy ..... 9457 A/89

[51] Int. Cl.[6] ..... B31B 1/16; B31B 1/25

[52] U.S. Cl. ..... 493/355; 493/369; 83/479

[58] Field of Search ..... 493/355, 365, 493/367, 368, 369, 370, 403, 479; 83/479

[56] References Cited

U.S. PATENT DOCUMENTS

| | | | |
|---|---|---|---|
| 3,587,374 | 6/1971 | Stewart et al. | 83/479 |
| 3,646,418 | 2/1972 | Sterns et al. | 83/479 |
| 3,882,765 | 5/1975 | Tokuno | 493/365 |
| 4,142,455 | 3/1979 | Coburn | 83/479 |
| 4,183,273 | 1/1980 | Greinke et al. | 83/479 |
| 4,269,097 | 5/1981 | Linn | 493/370 |
| 4,515,052 | 5/1985 | Flaum | 83/479 |

*Primary Examiner*—Jack W. Lavinder
*Attorney, Agent, or Firm*—McGlew and Tuttle, P.C.

[57] ABSTRACT

The present invention describes an apparatus for creasing and cutting an endless web of cardboard. A pair of rollers operates on the web while another pair of rollers is in an inactive position where the tools mounted on the rollers can be moved to new positions. When it is time for different operations to be performed on the web the original rollers working on the web are removed from their working position and the rollers previously in the inactive position are moved to the working position. The rollers now in the working position have had their tools aligned for the new operation while they were in the inactive position. The rollers originally in the working position are now in an inactive position where the tools on these rollers can be aligned for another operation. Each pair of rollers is independently driven to spin independent of the position of the roller. This independent driving of the pairs of rollers allows the rollers in the inactive position to be spun up to speed before being moved into the working position.

15 Claims, 16 Drawing Sheets

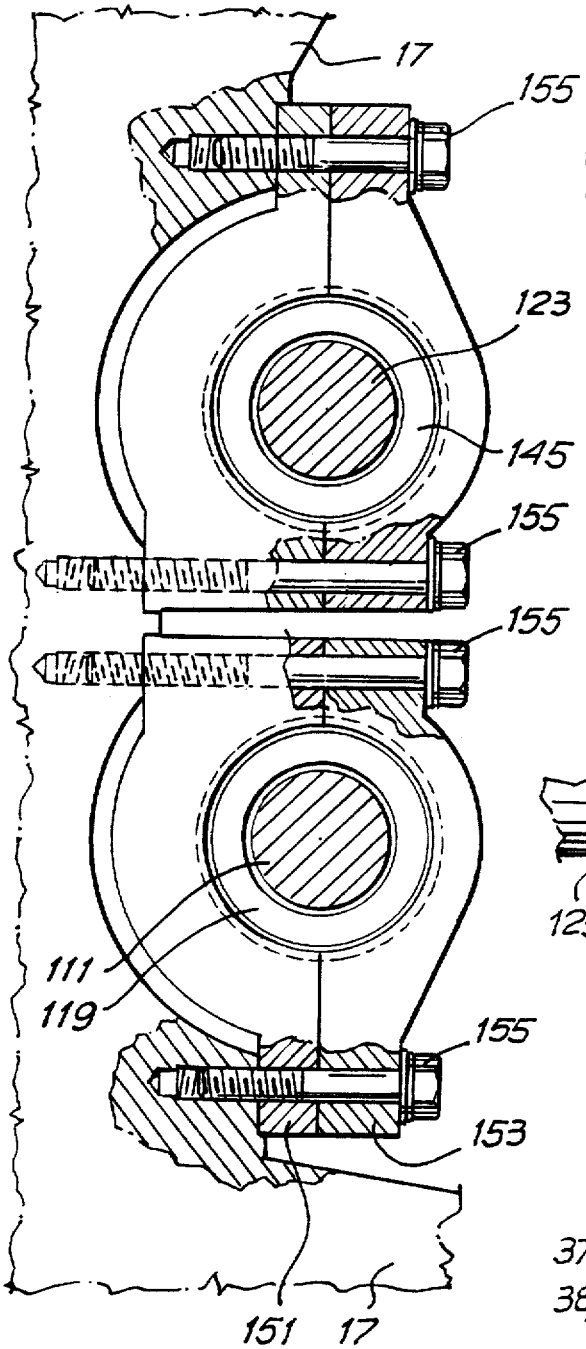
Fig. 8
Fig. 7A
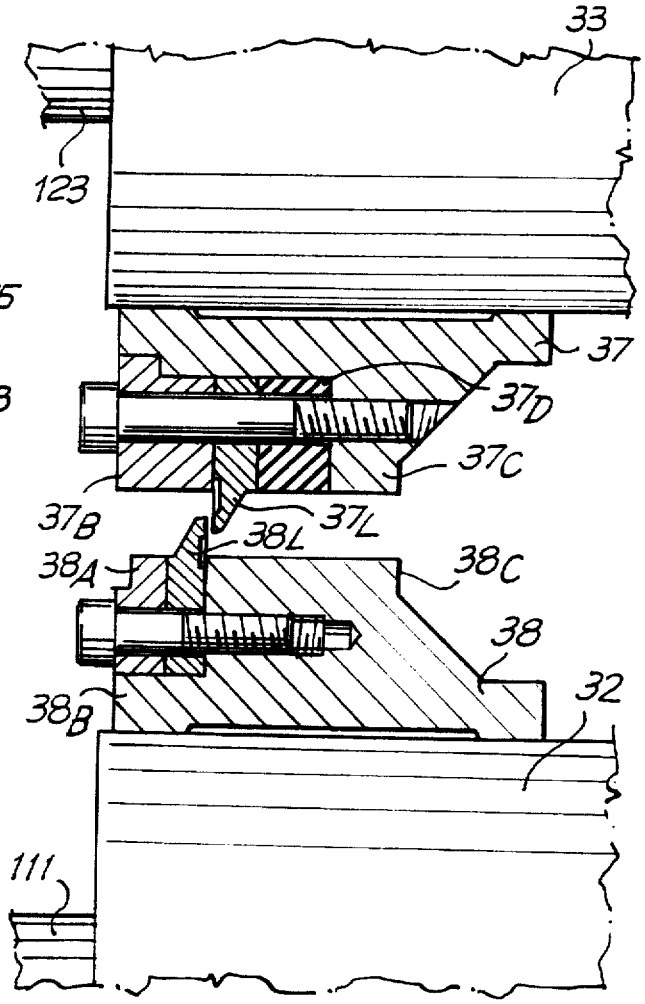

MACHINE FOR CREASING AND CUTTING ENDLESS WEBS OF CARDBOARD AND THE LIKE

Matter enclosed in heavy brackets [ ] appears in the original patent but forms no part of this reissue specification; matter printed in italics indicates the additions made by reissue.

FIELD OF THE INVENTION

The invention relates to a machine for creasing and cutting an endless web of cardboard or the like comprising at least two pairs of creasing rollers and at least two pairs of cutting rollers. The web of cardboard being processed pasts between the rollers of a first pair of creasing rollers and the rollers of a first pair of cutting rollers. Another pair of creasing rollers and another pair of cutting rollers are situated in inactive positions in operate means for the positioning of the respective tools.

BACKGROUND OF THE INVENTION

In the production of cardboard sheets, for example the manufacture of boxes from an endless web of cardboard, it is frequently necessary Io change the arrangement of the lengthwise creasing and cutting lines in accordance with the orders being proeased. In general, the orders relate to rather limited quantities, so thai in this field of the art the speed and punctuality of the aleration of the position of the folding and cutting tools comes extremely important. To this end, machines of various types have ken devised, initially with manual operation—that is to say with manual positioning and changing of the tools—and currently with automatic or semi-automatic operation. Among the most advanced machines for the creasing and cutting of endless webs of cardboard, of a known type, are machines which possess at least two pairs of creasing rollers, that is to say rollers bearing the creasing tools, and at least two pairs of cutting rollers. During operation, a single pair of creasing rollers and a single pair of cutting rollers are active: the second pair of creasing rollers and lhe second pair of cutting rollers are inactive and are arranged in an attitude which permits the moving and the positioning of the tools fitted thereon. A pair of robots provides for the displacement of the cutting and creasing tools on the pair of cutting and creasing rollers which are presently inactive, according to a program which depends on the next order which is to be processed. When the tools on the inactive rollers have been positioned and the processing of the previous order is completed, the attitude of the machine is modified in order to exchange the positions of the pairs of rollers, that is, to bring the rollers which were previously inactive into the working position, and deactivate those which were previously active, thus permitting the robots to position the crewing and cutting tools for a later order.

The known machines of this type possess a number of diedvantages. In many of said machines, in fact, the plane in which the web of cardboard runs has to be modified when the attitude of the machine is adjusted, that is to say when a pair of cutting rollers and a pair of creasing rollers are deactivated while another pair of cutting roller and another pair of creasing rollers are activated. This entails risks of irregular operation, and additionally makes it necessarry to use mobile surfaces for the running of the cardboard, which surfaces have to change attitude at each transition from the processing of one order to the processing of a subsequent order. In addition to the high cost and a particular complexity of control, these machines are also very bulky, in that the mobile running surfac project substantially, upstream and downstream of the cutting and creasing zone. This is particularly disadvantageous not only because it entails an increase in the overall length of the processing line, but also because it impedes the insertion of these automatic machines into prearranged processing lines which are currently equipped with machines having manual tool replacement. These machines being of much more limited size.

Furtherore. This arrangement of the pairs of cutting and creasing rollers in the machines of the known type renders the latter particularly bulky. In fact, in many of these machines the first pair of creasing rollers and the first pair of cutting rollers are arranged upstream (relalive to the direction of movemenl of the cardboard web) of the second pair of creasing rollers and the second pair of cutting rollers. This entails a further increase in the lengthwise bulk of the machine.

A further problem associated with this type of processing lies in the need Io exchange the tools as rapidly as possible in order 1o increase the productivity of the plant.

SUMMARY AND OBJECTS OF THE INVENTION

The object of the present invention is to provide a machine for the creasing and cutting of an endless web of cardboard of the abovementioned type which permits automatic, simple and rapid positioning and exchange of the tools, and hence rapid adaptation of the attitude of the machine to the various orders to be processed. and wherein the exchange of the tools (that is to say the replacement of one pair of creasing and cutting rollers by another pair of creasing and cutting rollers) does not involve modifying the trajectory followed by the cardboard web.

A further object of the invention is to provide a machine which is particularly compact. and hence can be inserted in pre-existing processing lines to replace machines using the manual substitution.

These and other objects and advantages of the machine according to the invention, which will become apparent to those skilled in the art from reading the text which follows, are obtained substantially by means of a machine of the abovementioned type, wherein: at least two pairs of creasing rollers and at least two pairs of cutting rollers are carried by an angularly mobile assembly which alternately assumes one of at least two angular positions in order to arrange one of at least two pairs of creasing rollers and one of at least two pairs of cutting rollers in the working position; and wherein each pair of creasing rollers and the respective pair of cutting rollers are situated on opposite sides relative to the axis of rotation of the angularly mobile apparatus. The cardboard web runs substantially in line with the axis of rotation of the mobile apparatus, so that the working zone of the machine is substantially at the level of the axis of symmetry of the assembly of cutting and creasing rollers. with one pair of creasing rollers and the corresponding pair of cutting rollers being simultaneously active in the intermediate position, while the inactive creasing and cutting rollers are situated above and below the zone through which the cardboard passes, that is to say the working zone of the machine, and in this position the robots intervene in order to position the tools for the subsequent order to be processed. Once a processing order has been completed, the entire assembly of rollers rotates about the axis of rotation of the mobile assembly in order to exchange the cutting and creasing tools.

With this arrangement, a machine is obtained which is particularly compact in both the vertical and the horizontal direction, which permits rapid and simple exchange of the tools and does not require mobile guide surface for the cardboard upstream and downstream of the creasing and cutting rollers.

Particularly advantageous forms of the machine according to the invention are indicated in the attached dependent claims. In particular, in one possible form of embodiment, said pairs of creasing rollers and said pairs of cutting rollers are supported by a pair of angularly mobile side pieces carried by a bearing structure of the machine. which side pieces are associated with means for controlling the rotation of said side pieces and hence the switching of the position of the pairs of rollers. The means for controlling the rotation of saiid side pieces can in practice comprise sectors of toothed wheels associated with said side pieces and engaging with correspoending pinions caused to rotate by an actuator and connected by means of a compensator bar. An optional intermittor may be provided in order to modify the rotary movement of the side pieces relative to the rotary movement of the actuator provided in order to actuate the rotation of said side pieces.

For the operation of the machine, the two pairs of creasing rollers must be actuated alternately, and the same applies to the two pairs of cutting rollers. Consequently different kinematic chains have to be provided for the actuation of the two pairs of cutting rollers and the two pairs of creasing rollers. In order to obtain a machine with a compact and balanced structure, it is possible to arrange that on a first side of the machine. transmission means are provided in order to transmit the rotary movement to a first pair of creasing rollers and to a first pair of cutting rollers, said first pairs of rollers working simultaneously, and on the other side of the machine analogous transmission means may be provided in order to transmit the movement to a second pair of creasing rollers and to a second pair of cutting rollers, said second pairs of rollers working simultaneously, and in alternation with said first pairs of rollers.

In a possible form of embodiment, the transmission means comprise, on each side of the machine, a central pulley which controls the movemeal of a flexible transmission member which is passed around pulleys which are coaxial with and fixed to the rollers of a corresponding pair of cutting rollers and around pulleys which are coaxial with and fixed to the rollers of a corresponding pair of creasing rollers optsite said culling rollers.

In order to guide the cardboard, profiles may be arranged between the pairs of crewing and cutting rollers and define at least two alternate conveying paths for the cardboard with support and sliding surfaces for said cardboard.

In a possible form of embodiment, one of the rollers of each pair of cutting rollers is axially mobile in order to bring together and move apart the tools of each pair of mutually interacting cutting tools. In order to obtain this axial displacement, it is possible to arrange that one of the supports of the axially mobile roller of each pair of cutting rollers is mounted in a seating which is angularly mobile and equipped with a thread interacting with a corresponding thread fixed on the corresponding mobile side piece, and that said angularly mobile seating is caused to oscillate angularly by an actuator in order to control the axial movement of said axially mobile roller. For regular operation during cutting, one of the blades of two opposing cutting tools may be fixed in a resilient manner, for example by means of a rubber ring.

At least one of the supports of each cutting roller can be openable in order to permit the removal and the replacement of the respective cutting tools and a support means may be provided for the cutting rollers during the operations of replacing the tools.

In order to permit accurate positioning of the interacting tools of each pair of rollers, in a particularly advantageous form of embodiment each means for the positioning of the tools comprises a fork for the simultaneous displacement of two opposing tools fitted on the rollers of a respective pair of rollers.

The invention will be better understood with reference to the description and the attached drawing, which shows a practical, non-limiting exemplary embodiment of said invention.

BRIEF DESCRIPTION OF THE DRAWINGS

FIG. 7A shows an enlarged detail of FIG.7;

FIG. 8 shows a local section along the line VIII—VIII in FIG. 7:

DETAILED DESCRIPTION OF THE DRAWINGS

Figure 1:
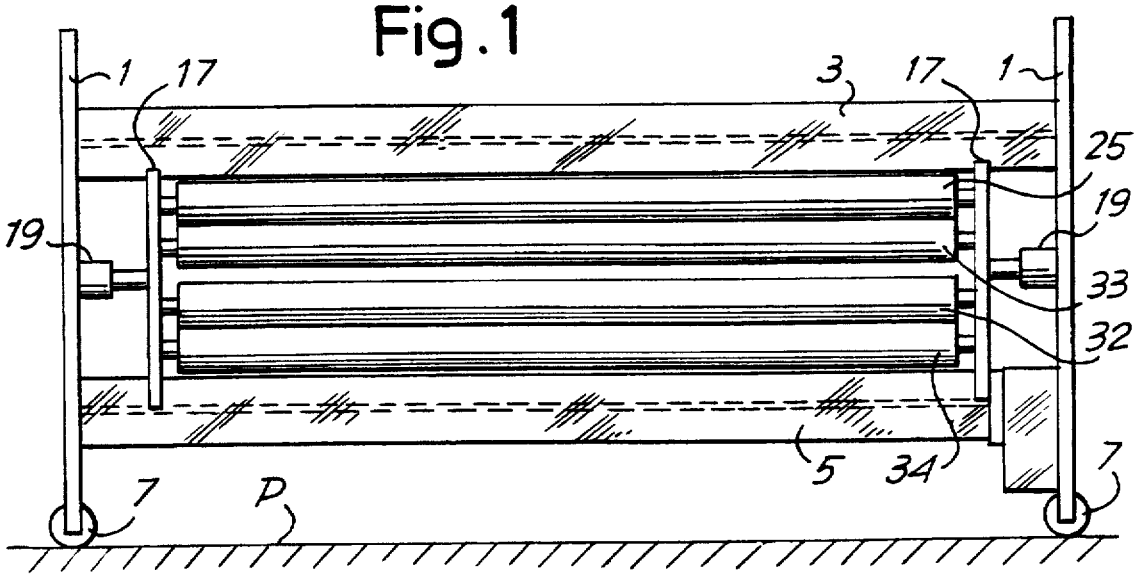
FIG. 1 shows a diagrammatic frontal view of the machine.
Figure 4:
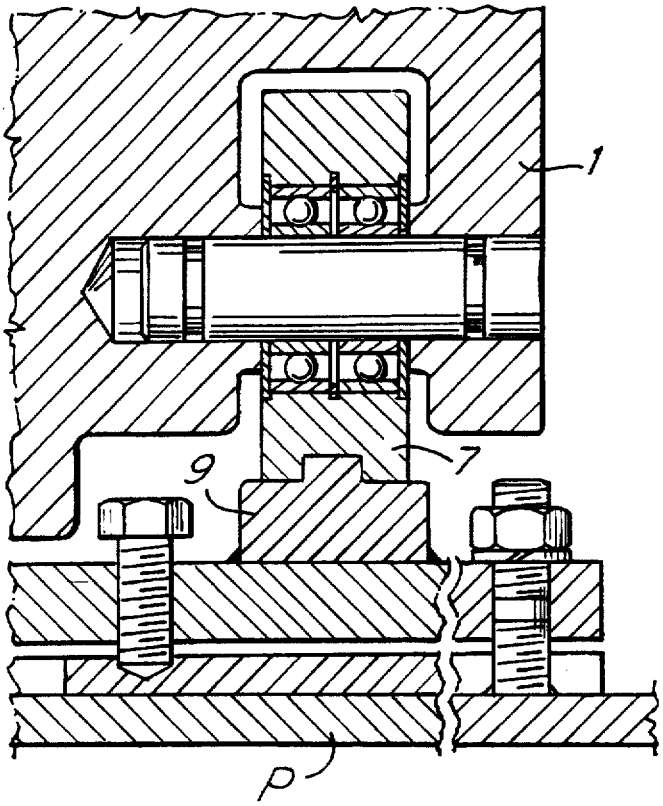
FIG. 4 shows a local section along IV—IV in FIG. 3.
Figure 2:
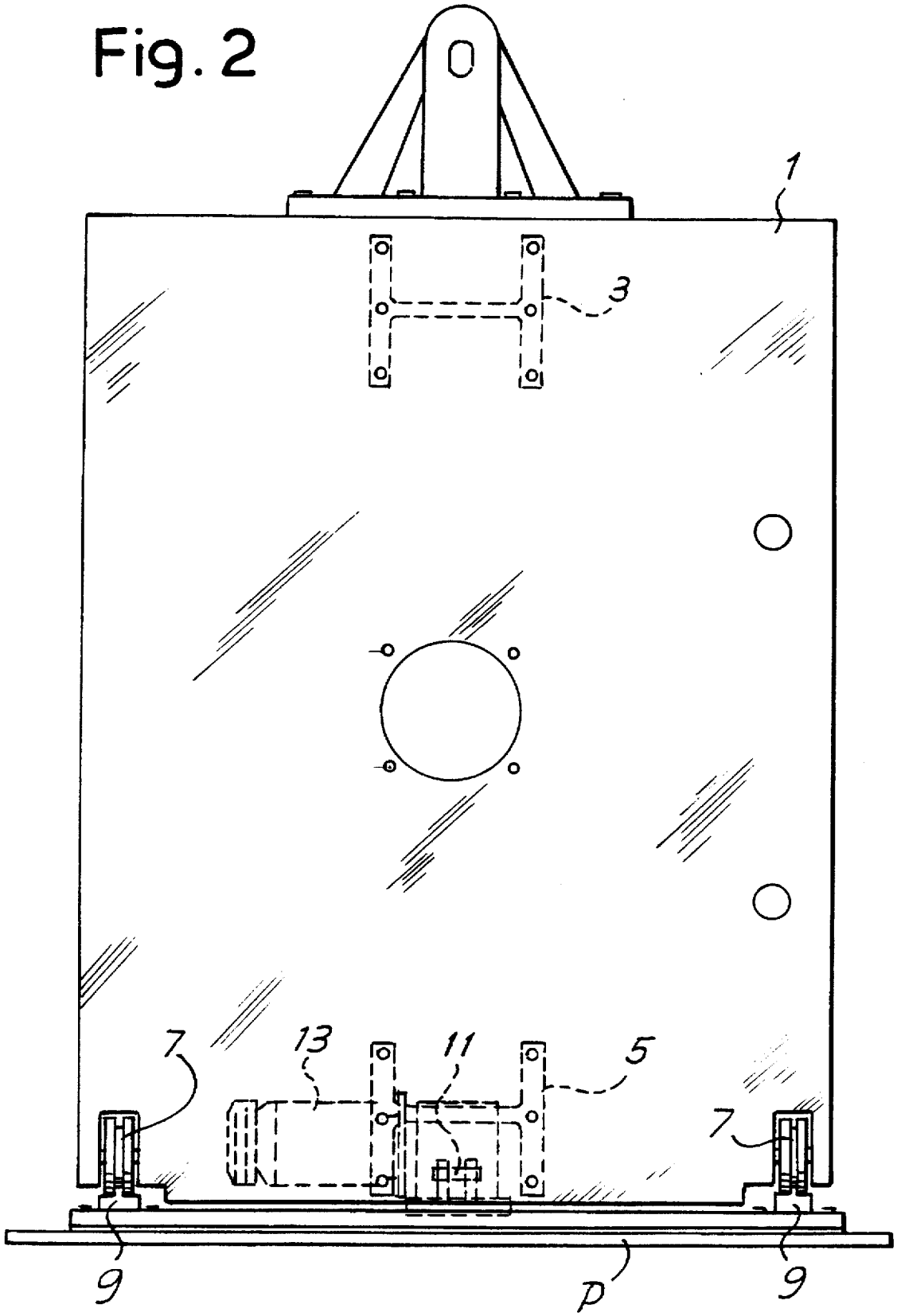
FIG. 2 shows a diagrammatic lateral view of the bearing structure.
Figure 3:
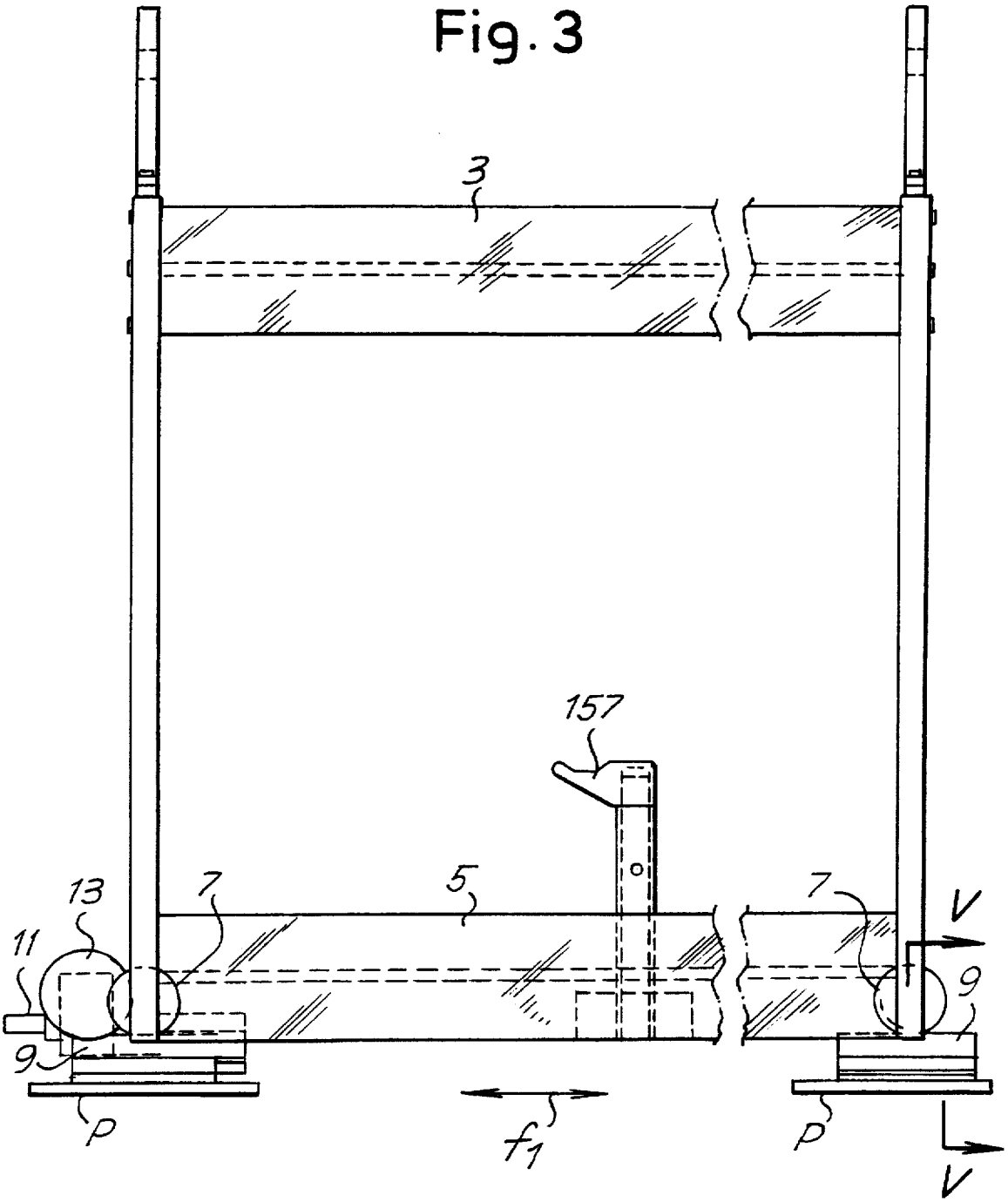
FIG. 3 shows a frontal view of the bearing structure of the machine according to the invention.

FIG. 1 shows, very diagrammatically, a front view of the machine according to the invention. As is illustrated in the figure, the machine comprises a bearing structure produced by means of a pair of lateral side pieces 1 mutually connected by upper and lower cross pieces 3 and 5 respectively. FIG. 2 shows a lateral view of the beating structure, while FIG. 3 shows a frontal view of said structure. The structure formed by the side pieces 1 and by the cross pieces 3 and 5 is equipped with support wheels 7 which roll on corresponding tracks 9 anchored to the floor P. Also anchored to the said floor P is a thread 11 (cf. in particular FIG. 3) upon which acts a reducing motor 13 which is rigidly connected to the bearing structure 1. 3. 5 and is capable of imparting to the structure transverse movements. in accordance with the double arrow f1 (FIG. 3), relative to the direction of advancement of the cardboard being processed. The transverse movement according to said arrow f1 permits the structure 1, 3, 5—and hence the whole machine—to follow any transverse tiltings and movements of the cardboard being processed.

The structure formed by the side pieces 1 and by the cross pieces 3 and 5 carries an assembly or oscillation rotary means which is capable of oscillating about an axis which is transverse relatively to the direction of advance of the cardboard fed to the machine. This assembly carries a number of pairs of shafts on which are mounted. respectively, the creasing tools and the cutting tools. More specifically, as is shown diagrammatically in FIG. 1, the oscillating assembly is formed by a pair of mobile side pieces 17 parallel to the uprights 1, and carried by supports diagrammatically and generically designated 19 in FIG. 1, and described in greater detail below with reference to FIG. 9. As is shown in greater detail in the section in FIG. 5 (taken in line with the rollers for supporting the creasing and cutting tools), the mobile side pieces 17 carry two pairs of rollers 21, 22 and 24, 25, respectively, on which are fitted creasing tools 27, 28 and 29, 30 respectively. Between said side pieces 17 there are also arranged two further pairs of rollers, designated 32, 33 and 34, 35 respectively, on which are fitted the respective cutting tools or blades, indicated respectively by 37, 38 and 39, 40.

The pairs of rollers 21, 22 and 24, 25 respectively are mutually adjacent and are arranged in a manner such that the planes defined by the axes of the rollers 21, 22 and of the rollers 24, 25 respectively are mutually perpendicular. The pairs of rollers 32, 33 and 34, 35 are similarly arranged. As is apparent particularly from FIG. 5, during operation the cardboard C passes in the direction of the arrow fC between one of the two pairs of rollers carrying the creasing tools, hereinafter called creasing rollers, and one of the two pairs of rollers carrying the cutting tools, hereinafter designated cutting rollers. More specifically, in FIG. 5, the cardboard C passes between the pair of rollers 21, 22 and the pair of rollers 32,33. Within the zone defined by the rollers 21, 22, 24,25 and 32, 33, 34, 35 are disposed profiles 43, 45, 47 and 49 defining two passages which are mutually inclined at an angle of 90' for the passage of the cardboard C. More specifically, in the attitude shown in FIG. 5, the cardboard C passes over the profiles 43, 49 which possess two horizontal planar portions, designated 43A and 49A respectively, which form a support for the cardboard. In a similar manner, the profile 45 possesses a portion 45A while the profile 43 possesses a further portion 43B, the portions 45A and 43B forming a bearing surface and running surface for the cardboard C when the position of the cutting and creasing rollers is rotated through 90° relative to the position shown in FIG. 5, that is to say when the cardboard passes between the creasing rollers 24, 25 and the cutting rollers 34, 35. This second position is obtained by rotation in the direction F (FIG. 5) of the entire group comprising the rollers 21, 22, 24, 25, 32, 33 and 34, 35, the profiles 43, 45, 47, 49 and the mobile side pieces 17. In order to obtain the rotation of this group, there is fixed to each mobile side piece a toothed wheel sector designated 51 in FIG. 5, which engages with a corresponding pinion 53 that transmits an oscillating rotary movement obtained from control means described in greater detail below. The pinion 53 begins to rotate at the moment in which the exchange of the tools is to be effected, by means of rotation of the entire group carried by the mobile side pieces 17.

Figure 5:
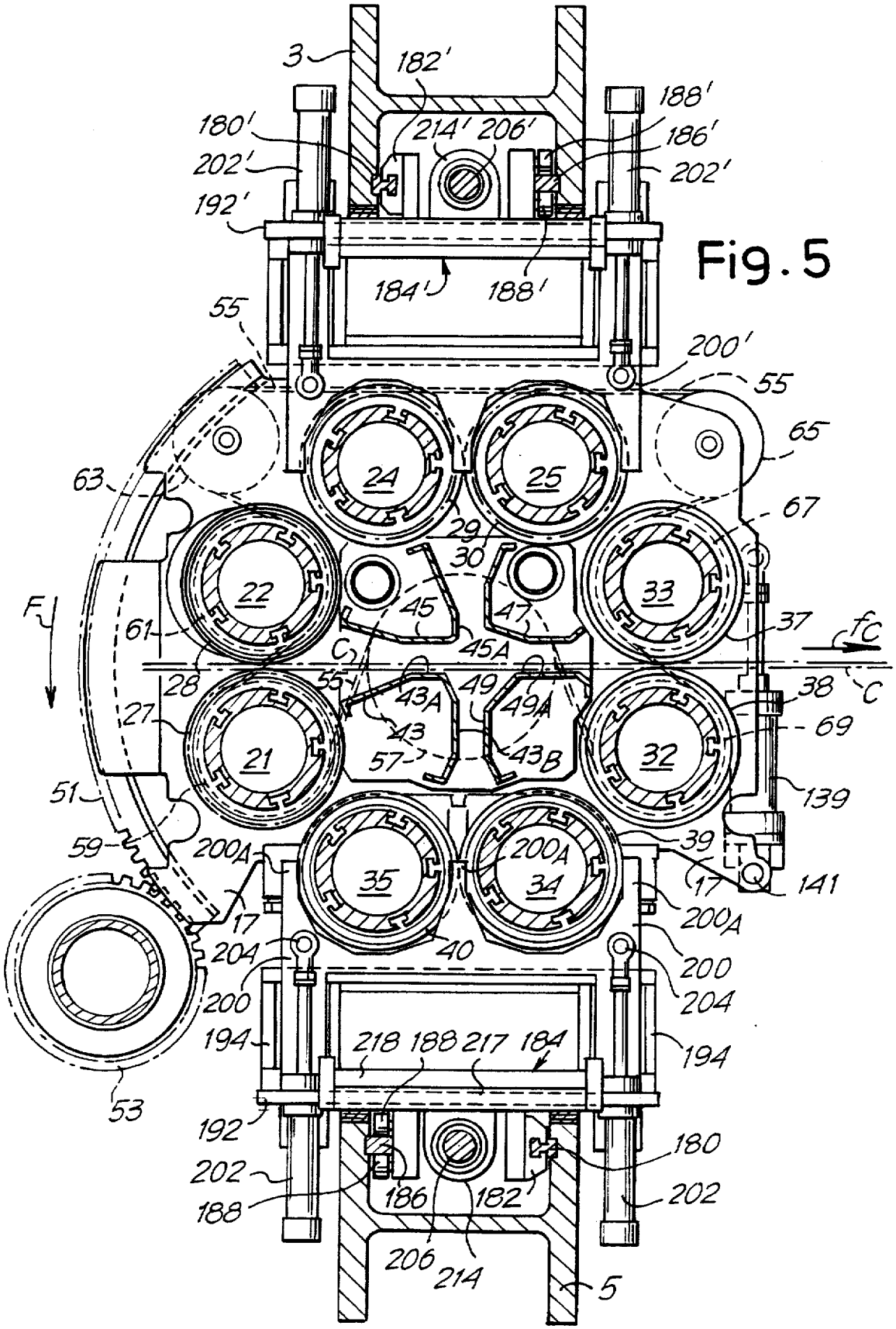
FIG. 5 shows a cross-section of the shafts bearing the cutting and creasing tools.

The creasing rollers 21, 22 and the cutting rollers 32, 33 are set to rotate by means of a flexible transmission means such as a single toothed belt 55 shown diagrammatically in broken lines in FIG. 5, which takes the motion from a central pulley 57 arranged in a symmetrical position relative to the tool-carrying rollers. The toothed belt 55 is then passed around toothed pulleys 59, 61 which are coaxial with and fixed to the rollers 21, and 22 respectively, in order to transmit the rotary movement to the creasing tools; it is then passed around two idle pulleys 63,65, and subsequently around pulleys 67 and 69 which are coaxial with and fixed to the rollers 33 and 32 respectively, carrying the cutting tools. The pulleys 57, 59, 61, 63, 65, 67, 69 are arranged on one side of the machine, while corresponding pulleys for the transmission of the motion to the other rollers 24, 25 and 34, 35 respectively are symmetrically arranged on the opposite upright side of the machine.

Figure 6:
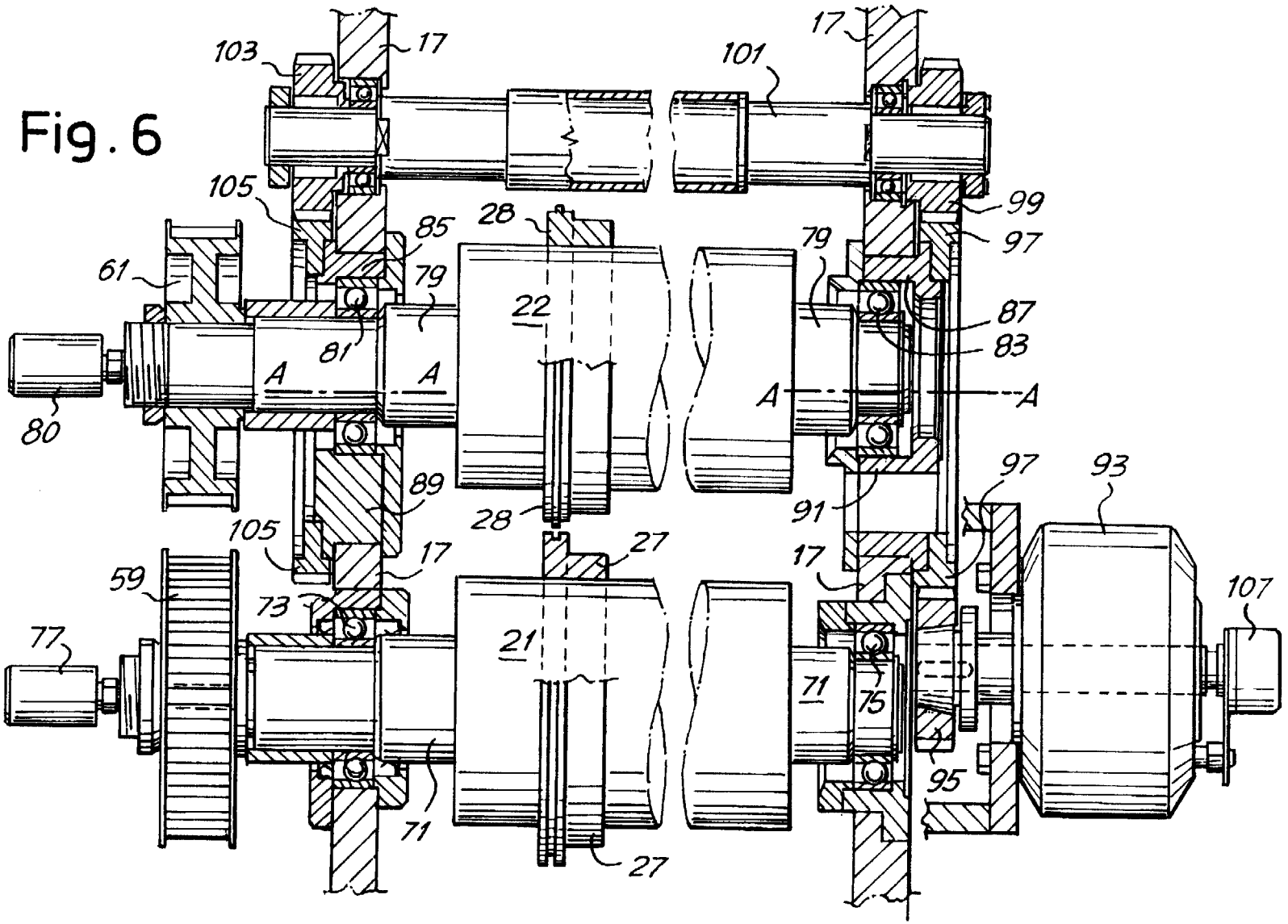
FIG. 6 shows a cross-section of the machine at the level of one of the pairs of cylinders bearing the creasing tools.

FIG. 6 shows a cross-section of the machine in line with the supports of the creasing rollers 21 and 22. As shown in FIG. 6, the roller 21 is carried by a shaft 71 supported by means of bearings 73, 75 on the mobile side pieces 17. In the vicinity of the left-hand end (in the drawing) of the shaft 71 is keyed the toothed pulley 59. At said left-hand end the shaft 71 is fixed to a manifold 77 for the conveying of the compressed air for the locking of the creasing tools 27 on the roller 21: the pneumatic locking means for the tools are of a type known per se and hence not illustrated in greater detail. The creasing roller 22 is carried, in an analogous manner to the creasing roller 21, by a shaft 79 supported at the ends by bearings 81, 83. The bearings 81 and 83 are accommodated in corresponding seatings 85, 87 made in respective flanges 89, 91. The flanges 89, 91 are attached in respective seatings in the mobile side pieces 17. Associated with the shaft 79 is a manifold 80, analogous to the manifold 77, for the compressed air for locking the creasing, tools 28 fitted on the roller 22.

As is clearly shown in FIG. 6, the seatings 85, 87 in which the bearings 81 and 83 are accommodated are eccentric relative to the flanges 89, 91. Consequently, rotation of the flanges 89, 91 in their seatings about the respective axes designated A—A produces a rotary movement of the axis of the shaft 79 about said axis A—A, and hence a movement of the creasing tool 28 closer to or farther from the creasing tool 27. The rotation of the flanges 89, 91 thus permits regulation of the creasing pressure. In order to obtain the rotation of said flanges, a reducing motor 93 is provided on the fighthand side piece 17 (in the drawing), on the output from which shaft is keyed a pinion 95 which engages with a toothed wheel 97 fixed to the flange 91. The rotation of the pinion 95 consequently causes the rotation of the flange 91. On the toothed wheel 97 there engages a further pinion 99, keyed on a compensator bar 101 which transmits the rotary motion to a pinion 103 keyed at its opposite end and engaging with a toothed wheel 105, corresponding to the toothed wheel 97, fixed to the flange 89. Associated with the shaft at the output from the reducing motor 93 an encoder 107 is provided which supplies the angular position of said shaft and hence the angular position of the shaft 79 carrying the roller 22: a predetermined working pressure of the creasing tools corresponds to each angular position of the shaft 79.

An arrangement symmetrical to that shown in FIG. 6 is adopted for supporting the creasing rollers 24, 25 and transmitting the motion to said rollers. The pulleys (corresponding to the pulleys 59, 61) for controlling the rollers 24, 25 are situated on the side piece 17 opposite to the pulleys 59, 61, that is to say on the side piece 17 carrying the reducing motor 93 (FIG. 6).

Figure 7:
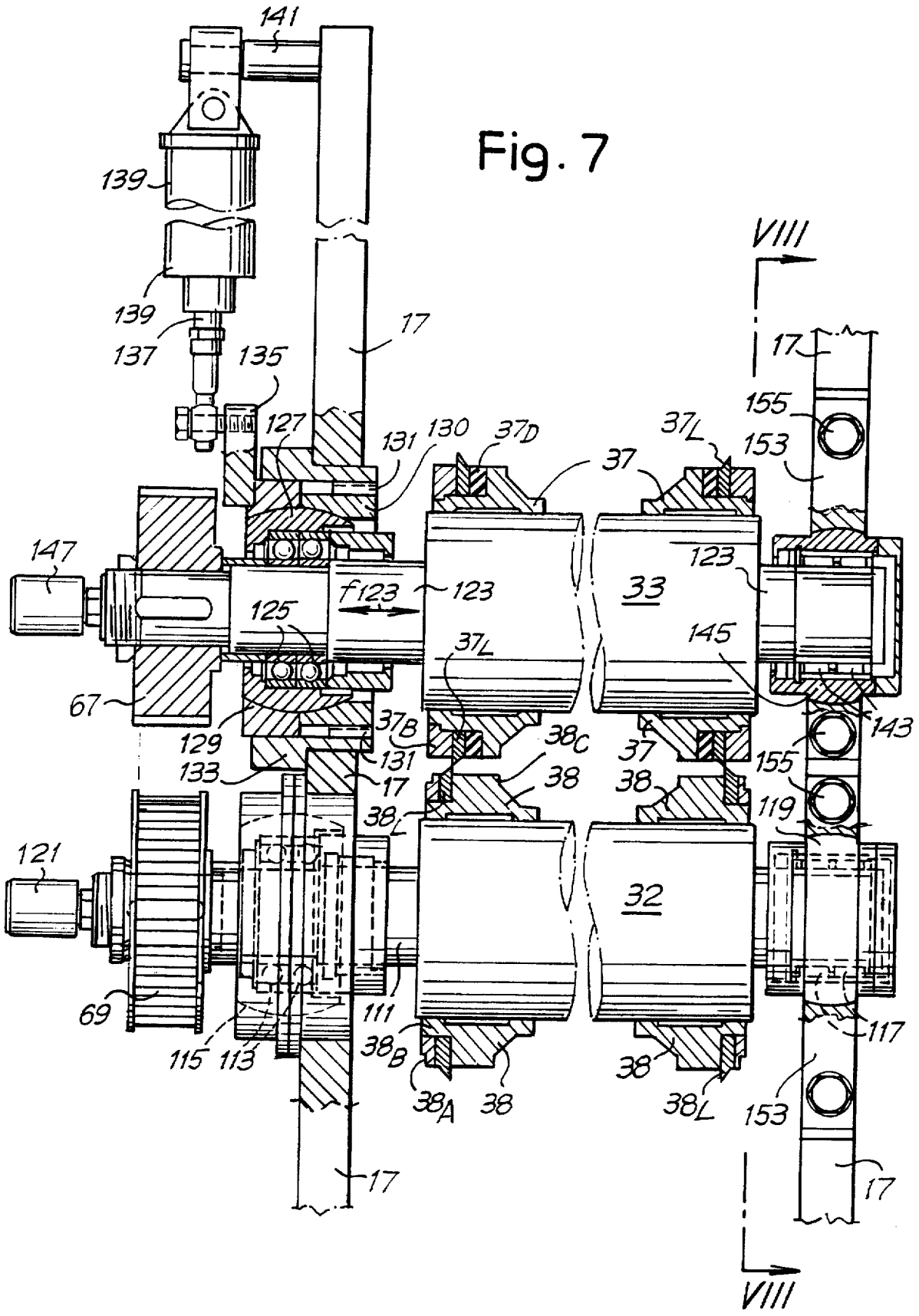
FIG. 7 shows a cross-section of the machine in line with one of the pairs of cylinders bearing the cutting tools.

The FIG. 7 shows the assembly which transmits the motion to the cutting rollers 32 and 33. The cutting roller 32 is carried by a shaft 111 supported at one end (the left-hand end in FIG. 7) by a pair of oblique bearings 113. The oblique bearings 113 are seated in an oscillating bush 115, carried by the corresponding mobile side piece 17. The bush 115 permits slight oscillations at the axis of the shaft 111 to compensate for any non-alignments of the supports. At the opposite end the shaft 111 is supported by a roller bearing 117 seated in a bush 119, which also oscillates. The roller bearing 117 permits slight axial displacements of the shaft 111. The toothed pulley 69 is keyed in the vicinity of the left-hand end (in the drawing) of the shaft 111. Also associated with said left-hand end of the shaft II1 is a manifold 121 for the distribution of the compressed air to the means for locking the cutting tools 38 fitted on the roller 32. As in the case of the creasing tools, so in the case of the cutting tools the pneumatic locking means used are of a known type and hence are not described in greater detail. FIG. 7 shows two cutting tools 38 mounted symmetrically on the respective roller 32. The two mountings shown can be used alternatively, in the sense that all the tools keyed on the roller 32 are to be mounted either in the attitude shown for the tool on the left or in the attitude shown for the tool on the right in FIG. 7, this being so because of the positioning requirements of the tools, described below.

The cutting roller 33 is supported by a shaft 123 supported at its left-hand end (in the drawing) by a pair of oblique bearings 125 seated in an oscillating bush 127 analogous to the bush 115, and able to permit slight oscillatory displacements of the axis of the shaft 132. The bush 127 is seated in a seating formed by two elements 129, 130 which are mutually coupled and one of which (specifically, the element 130) possesses a thread 131 engaging with a corresponding thread of a sleeve 133 fixed to the respective side piece 17. The elements 129 and 130 forming the seating for the bush 127 are mechanically fixed, by means of a link rod 135, to the stem 137 of a cylinder/piston system 139, the cylinder of which is fixed at 141 to the mobile side piece 17. The arrangement is such that, by means of the cylinder/piston actuator 137, 139, it is possible to control the rotation of the seating 129, 130 of the bush 127 relative to the sleeve 133 fixed to the side piece 17. The relative rotation between the seating 129, 130 and the sleeve 133 causes, by reason of the thread 131, an axial displacement in the direction f123 of the shaft 123 carrying the cutting roller 33. This axial displacement serves to impose the cutting pressure on the tools 37, 38. At the opposite end from the support bearings 125, the shaft 123 is supported by a roller bearing 143 seated in an oscillating bush 145. The oscillating bush 145 permits oscillatory movements of the shaft 123 to compensate for any non-alignments of the supports, while the roller bearing 143 permits an axial displacement in the direction f123 for the purposes indicated above. At the opposite end from the bearing 143, the pulley 67 is keyed on the shaft 123. Associated with the end of the shaft 123 at which the pulley 67 is keyed is a manifold 147, corresponding to the manifold 121, for the introduction of the compressed air for locking the tools 37.

As shown in FIG. 8, the oscillating bushes 119 and 145 for the support of the shafts 111 and 123, respectively, are accommodated in seatings produced by means of two element 151, 153, mutually coupled by means of screws 155 which also serve for connection to the corresponding mobile side piece 17. By unscrewing the screws 155, it is possible to open the supports of the shafts 111 and 123 to permit the withdrawal of the cutting tools 37 and 38 mounted thereon. In fact, whereas the creasing tools can be produced in two parts (as is apparent, in particular, from FIGS. 5 and 6), the cutting tools are preferable produced in a single piece in order to permit cleaner cutting and reduce wear on the tools; therefore, they can be replaced only by dismantling at least one of the supports of the respective shafts. When the supports of the shaft 111, 123 are opened in order to carry out the replacement of the tools, the corresponding rollers are supported by a support member 157, illustrated diagrammatically in FIG. 3.

Figure 9:
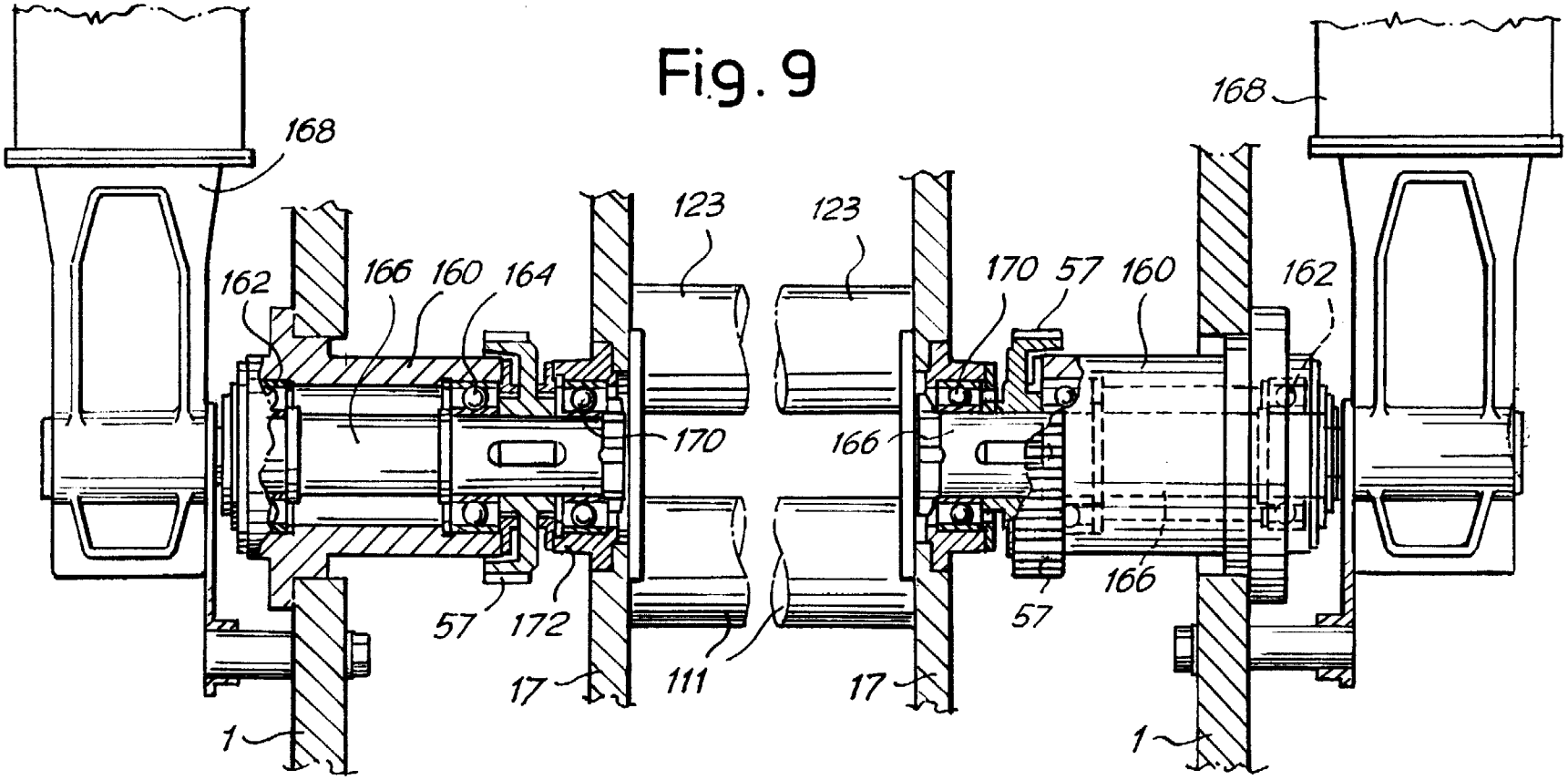
FIG. 9 shows a local cross-section of the machine in line with the two shafts for transmitting the motion to the cutting and creasing tools.

FIG. 9 shows a cross-section of the machine in line wilh the axis of transmission of the motion to the central pulley 57. Referring initially to the left-hand portion of FIG. 9, a sleeve 160 is fixed to the side piece 1, within which sleeve two support bearings 162 and 164 are provided for a shaft 166 on which the pulley 57 is keyed. The shaft 166 is caused to rotate by a reducing motor 168 applied to the outside of the side piece 1. On the end of the shaft 166 opposite the reducing motor 168 is fitted a third bearing 170 accommodated in a bush 172 fixed to the corresponding mobile side piece 17 in order to support the said side piece 17. As is clearly visible in FIG. 9, a symmetrical arrangement of transmission members is associated with the right-hand mobile side piece (in the drawing) in order to transmit the rotary motion to a corresponding pulley 57. Each pulley 57 controls a pair of creasing rollers and a pair of cutting rollers, and the arrangements of the kinematic members of the two groups are symmetrical.

Figure 10:
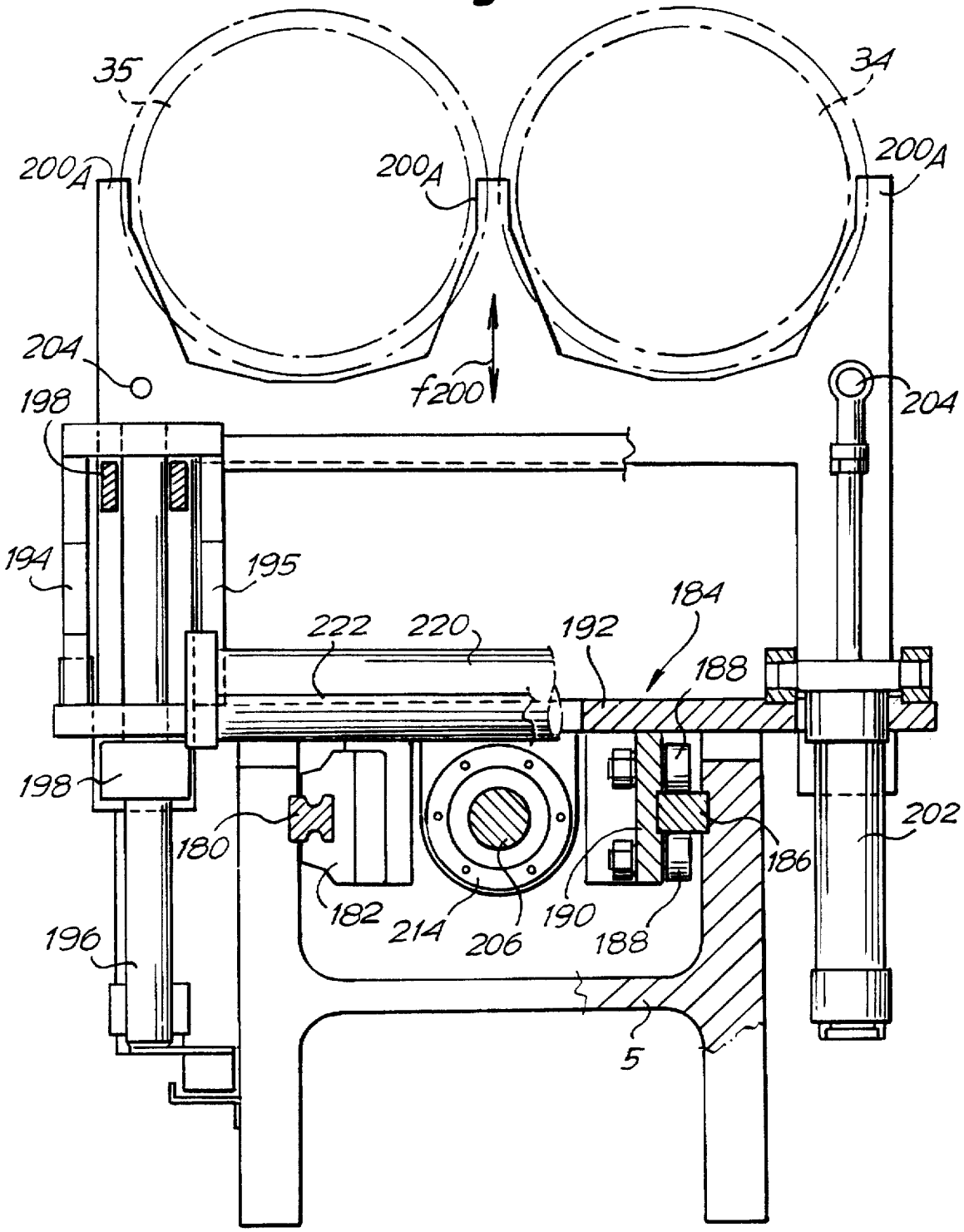
FIG. 10 shows a frontal view, in partial section, of the carriage group for moving the tools.
Figure 11:
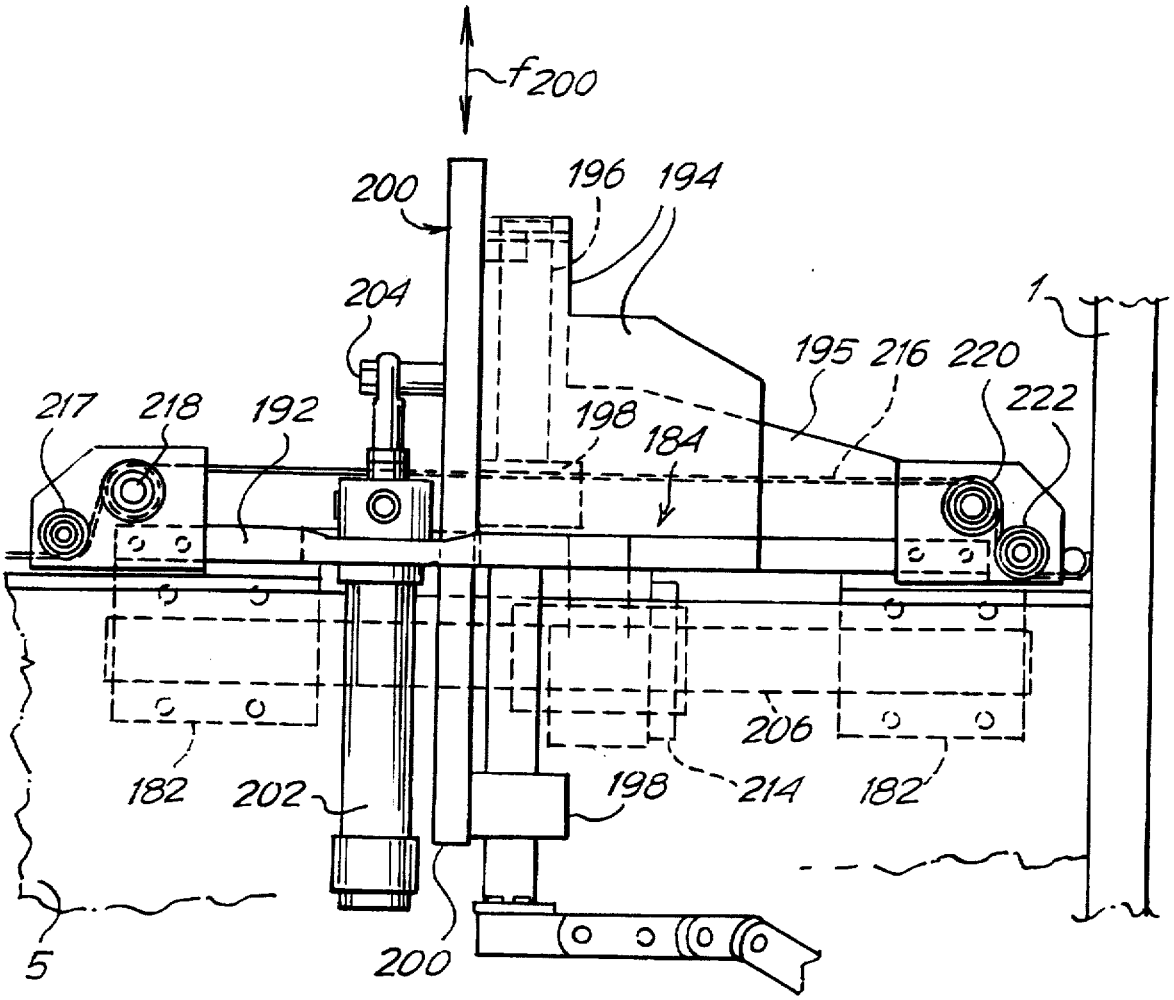
FIG. 11 shows a view of the carriage of FIG. 10.

FIGS. 10 and 11 show the details of one of the two carriages carrying the forks for the movement and positioning of the cutting and creasing tools along the respective support rollers. In particular, FIG. 10 shows a frontal view of the lower carriage with the fork in the working position, that is to say close to the respective rollers which, in this ease, are the rollers :34, 35 carrying the cutting tools; FIG. 11, on the other hand, shows a lateral view of the carriage of FIG. 10 with the respective fork in the retracted position, that is to say inactive. As can be seen in particular in FIG. 10, a shaped guide 180 is applied to the cross piece 5 of the bearing structure of the machine, on which guide there slide guide shoes 182 of a carriage, generically designated 184. On the wing of the cross piece 5, opposite the wing carrying the shaped guide 180, a further guide 186 is arranged, on which rotate free-wheels 188 carried by a bracket 190 secured to a plate 192 which forms lhe bearing structure of the carriage 184.

Figure 15:
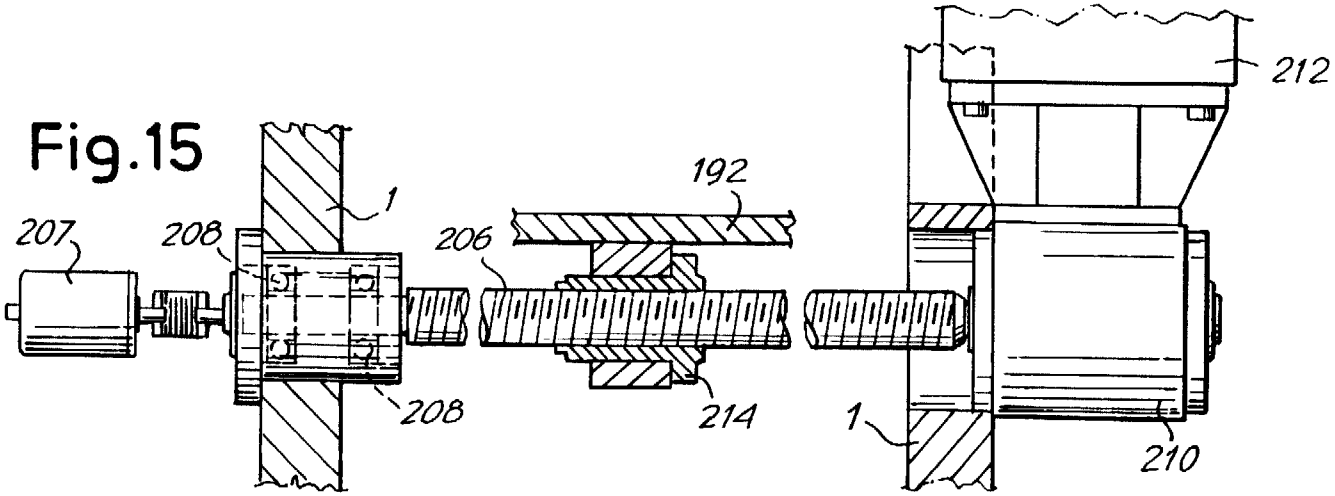
FIG. 15 shows a lengthwise section through the means for advancing the carriage shown in FIGS. 10 and 11.

Adjacent to the two sides of the plate 192, and parallel to the rollers 34, 35, are fitted support brackets 194, 195 for a cylindrical tubular bar 196 forming a cylindrical guide for corresponding guide bushings 198 fixed to the double fork generally designated 200. The fork 200 is therefore guided along two cylindrical bars 196 by means of two pairs of superposed bushings 198, positioned at the sides of said fork. The fork 200 is controlled in a movement towards and away from the respective rollers (in the illustrated case, the rollers 34, 35), for the movement and positioning of the respective tools. The movement towards and the movement away, in the directions of the double arrow f200, are controlled by a pair of cylinder/piston actuators designated 202. The stems of the actuators 202 are connected at 204 to the fork 200, and their movement determines the movement of the fork 200 towards and away from said rollers 34, 35. In order to position the tools along the respective rollers, it is necesary for the carriage 184 and the respective fork 200 to be displaced transversally relative to the direction of advance of the cardboard, that is to say lengthwise relative to the tool-carrying rollers. For this purpose, the uprights 1 support a threaded bar 206. The threaded bar 206 is carried at one end by a pair of bearings 208 (see in particular FIG. 15): the opposite end of said bar 206 is kinematically connected, via an angular counter shaft 210, to a direct current motor 212. On the threaded bar 206 is fitted a nut 214 fixed to the plate 192 of the carriage 184. The rotation of the threaded bar 206 controlled by the motor 212 thus causes the nut 214 to slide along said bar, and consequently the transverse displacment of the carriage 184 relative to the machine. An encoder 207 (FIG. 15) is associated with one end of the threaded bar 206 in order to record the angular position of the threaded bar 206 and hence of the carriage 184.

In order to avoid the accumulation or scraps and dust on the guides 180 and 186, the latter are covered by a protective band 216 extending transversally to the machine between the two uprights 1. The carriage 184 is equipped with four rollers 217, 218, 220 and 222 capable of lifting the band in order to permit the passage of said carriage on said guides 180 and 186.

The carriage 184 now described is positioned below the zone of passage of the cardboard C, and serves to position the tools on the two rollers which are situated from time to time in the lower position. In particular, in the attitude of FIG. 5, the carriage 184 serves to position the cutting tools 39 and 40 fitted on the rollers 34 and 35. In the upper zone of the machine, at the level of the cross piece 3, is provided a second carriage generically designated 184' for the positioning of the tools along the rollers arranged in the upper position. In FIG. 5, the carriage 184', with an associated fork 200', serves to position the creasing tools, 29, 30 along the respective rollers 24, 25. The carriage 184', analogously to the carriage 184, is guided by means of shoes 182' which are slidable along a guide 180' and by means of wheels 188' which roll on a guide 186'. A plate 192' carries actuators 202' for the movement of the fork 200' towards and away from the respective rollers. The movement of the carriage 184' in a direction parallel to the axes of the rollers 24 and 25 is obtained by means of a threaded bar 206', corresponding to the threaded bar 206, on which a nut 214' is fitted.

Figure 12:
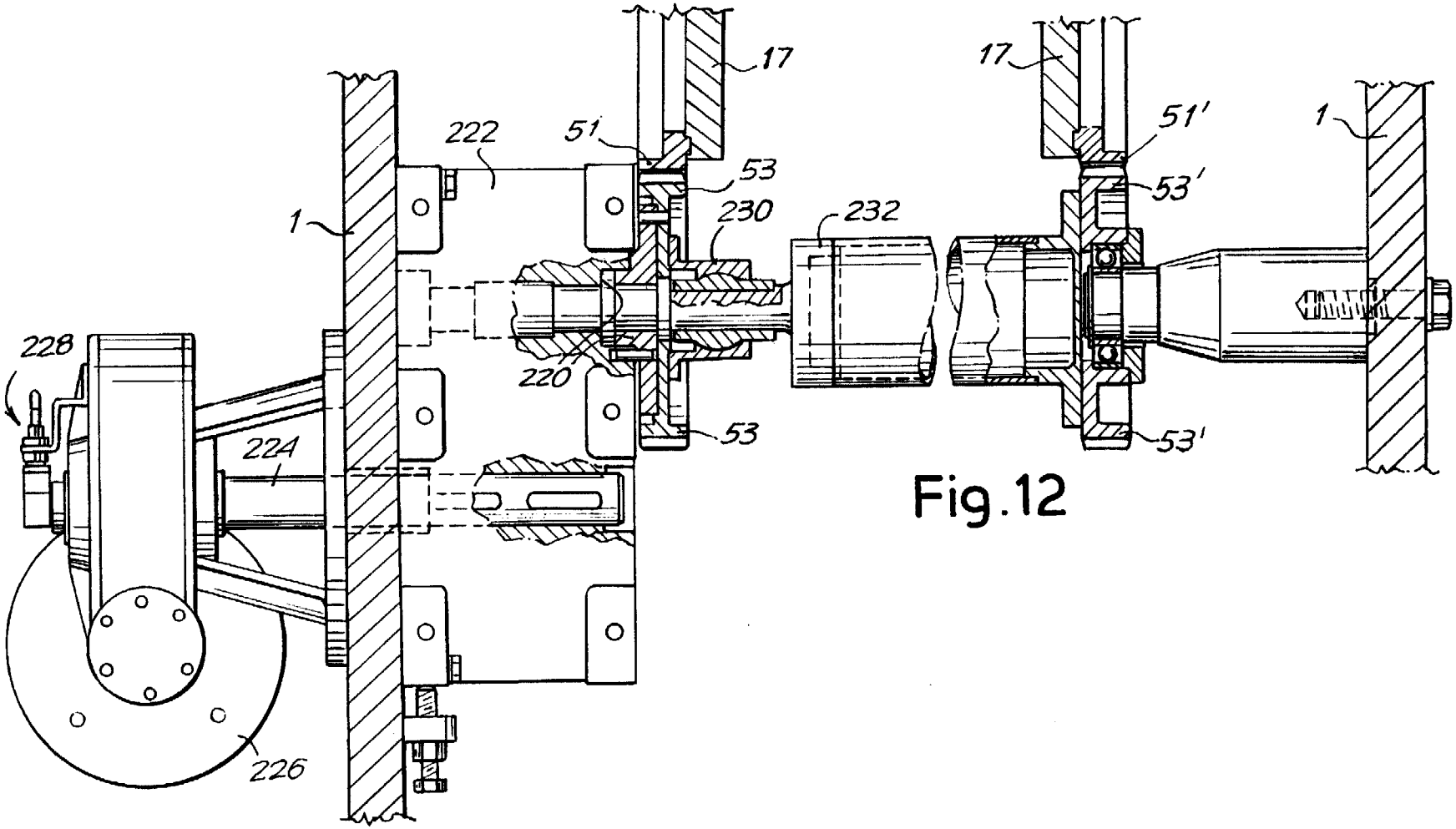
FIG. 12 shows a local cross-section of the machine in line with the assembly for transmitting the oscillating movement for the exchange of the tools.

As mentioned above the rotation of the mobile side pieces 17 is obtained by means of the toothed wheel sector 51 engaging with the pinion 53 (FIG. 5), FIG. 12 shows in greater detail the assembly for transmitting the motion to the side pieces 17. As can be seen in said FIG. 12, the pinion 53 is keyed on an output shaft 220 from a cambox or intermittor 222, whose input shaft 224 is controlled in rotation 5y a reducing motor 226. Associated with the shaft 214 is the sensor 228. for example of the magnetic type capable of recording the angular position of said shaft 224 in a manner such as to control the stopping of the rotation when said shaft has completed a predetermined angle. In the particular case. the side piece 17 and the cutting and creasing rollers associated therewith have to be rotated through 90° when the tools are to be exchanged. The sensor 228 is therefore capable of determining a corresponding rotation of the input shaft 224 of the intermittor 222. Internally, the intermittor 224 possesses a cam system such that the extent of the rotation of the output shaft 220 is, overall, equivalent to the extent of rotation of the input shaft 224; however, the effect of said intermittor is that the rotation of the output shaft 220 commences after a certain delay relative to the commencement of the rotation of the input shaft 224, and ends before the end of the rotation of said shaft 224. The rotation of the shaft 220 is transmitted via the first pinion 53 to a first toothed wheel sector 51, fixed to the first of the two mobile side pieces 17, and via a joint 230 to a compensator bar 232, at whose opposite end (on the right in FIG. 12) is connected the second pinion 53' engaging with a corresponding toothed wheel sector 51' fixed to the second mobile side piece 17. The entire transmission system is supported by the uprights 1, as shown in the figure.

Figure 13:
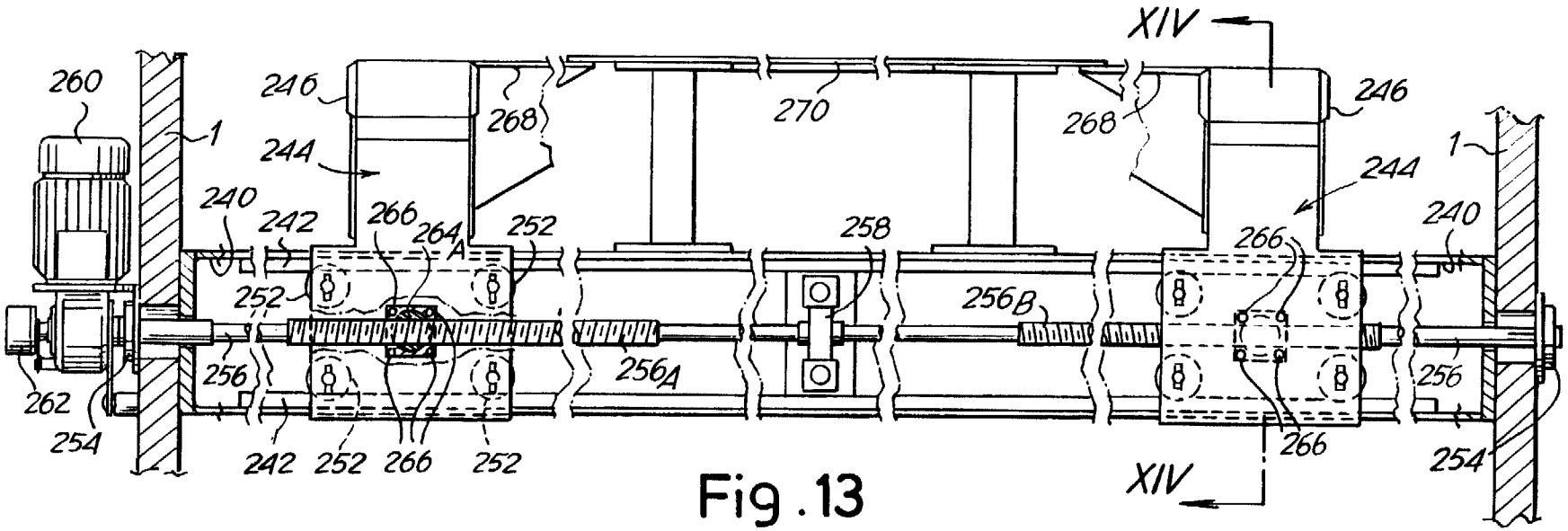
FIG. 13 shows a local cross-section in line with the suction apertures for the cardboard trimmings.
Figure 14:
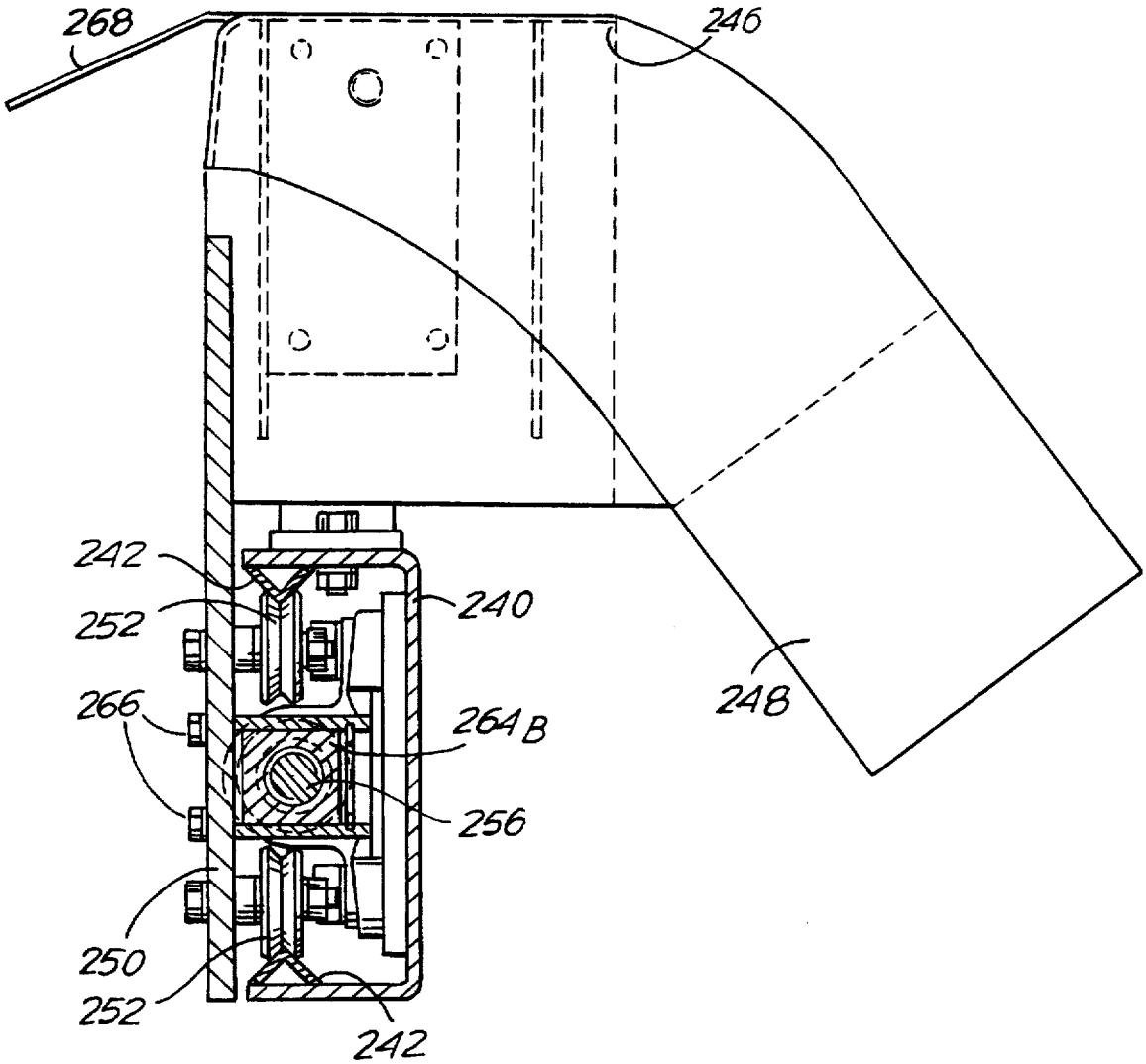
FIG. 14 shows a section along XIV—XIV in FIG. 13.

The machine which has been described is completed by a set of apertures for the aspiration of the trimmings which are formed by the cutting of the cardboard. The set is shown, in particular, in FIGS. 13 and 14. As shown in hid figures a "C"-profile, designated 240, is fitted to the outer uprights 1 and extends transversally relative to the machine and relative to the direction of advance of the cardboard. Two "L"-profiles, designated 242, are welded to the profile 240 and form a guide system for two carriages 244 carrying suction apertures 246 connected to suction lines 248 (FIG. 14). The carriages 244 possess a bearing plate 250 on which are mounted four free wheels of V-shape profile, designated 252, which roll on the profiles 242 that form respective rolling guides. The uprights 1 support, by means of bearings 254, a bar 256 which possesses two threaded portions 256A and 256B, arranged symmetrically relative to an intermediate support bearing 258 carried by the profile 240. The bar 256 can be caused to rotate by means of a reducing motor 260 connected to one end of the threaded bar 256 emerging from one of the two uprights 1. Associated with the projecting end of the threaded bar 256 is an encoder 262, capable of recording the angular movement of the threaded bar. Nuts 264A and 264B, respectively, are fitted on the two threaded portions 256A and 256B and anchored by screw means 266 to the two plates 250 of the carriages 244. Since the two threaded portions 256A and 256B have threads running in optsire directions, the roution of the bar 256 in one direction or the other determines the simultaneous movement of the two carriages 244 towards or away from the center line of the machine. Associated with each carriage 244 is a respective shaped plate 268, which, together with the fixed plate 270, forms a bearing and sliding surface for the cardboard being processed. When the carriages 244 are moved towards or away from the center line of the machine, the shard plates 268 slide under the fixed plate 270 forming a surface which can be telescopically shortened and extended in order to adapt to the different formats of cardboard being processed: the suction apertures 246 are positioned in each case in alignment with the outermost cutting lines.

Thc operation of the machine described above is as follows. In the attitude shown in FIG. 5, the cardboard C being processed passes between the pair of creasing rollers 21,22 and the pair of cutting rollers 32, 33. Simultaneously, the second pair of creasing rollers 24, 25 is situated at the highest point of the machine, in line with the carriage 184' carrying the fork 200'. Conversely, the second pair of cutting rollers 34, 35 is situated at the bottom point of the machine, in line with the carriage 184 and the corresponding fork 200. While the cardboard C is being creased and cut in the positions determined by the attitude of the creasing tools 27, 28 and the cutting tools 37, 38, the creasing tools 29, 30 fitted on the rollers 24, 25 and the cutting tools 39, 40 fitted on the rollers 34, 35 are displaced by the forks 200' and 200 respectively, to be disposed in the positions required by the next order to be processed. The movements of the carriages 184, 184' and of the corresponding forks 200, 200' can be appropriately programmed in accordance with processing requirements.

When the order being processed is finished, and the machine is to be prepared for the processing of a subsequent order, which differs from the preceding order in respect of the position of the cutting lines and/or the position of the creasing lines, the cardboard web is sethered by a transverse cut to create what is called a "hole" as it reaches the creasing and cutting machine. At this point the rotating assembly formed by the side pieces 17 and by all the creasing rollers 21, 22, 24, 25 and cutting rollers 32, 33, 34, 35 is caused to rotate through 90° by means of the pinions 53 and 53' engaging with the toothed wheel sectors 51 and 51' (see in particular FIG. 12). The rotation takes place in a manner such that the creasing rollers arc always upstream of the curling rollers relative to the direction of advance of the cardboards C. Consequently, the rotating assembly formed by the side pieces 17 and by the creasing and cutting rollers will bc caused to rotate from the attitude of FIG. 5 through 90° counter-clockwise in order to bring the creasing rollers 24, 25 into the position previously occupied by the creasing rollers 21, 22, while the latter arc displaced into the lower position previously occupied by the cutting rollers 34, 35 simultaneously, said cutting rollers 34, 35 assume the working position to replace the rollers 32, 33, which for their part are displaced into the upper position previously occupied by the creasing rollers 24 and 25. The subsequent rotation will take place clockwise.

The cutting tools 37, 38, 39, 40 have, in cross-section, a profile which can be seen in detail in FIG. 7A, which shows an enlarged detail of thc section of FIG. 7. This profile permits correct positioning and approach of the cutting tools. More particularly, with reference to the cutting tools 37, 38 which can be seen in the detail of FIG. 7A, the lower cutting tool 38 possesses an annular step 38A which is set back relative to the front surface 38B of said tool, which surface, in use, is aligned with the front surface 37B of thc upper tool 37. When the tools 37, 38 are to be displaced by the fork 200, the ends 200A (see in particular FIGS. 5 and 10) first approach the surface 37B of the tool 37, which is advanced by an amount of, for example, 2 mm relative to the step 38A, and causes a displacement of the single tool 37 along the respective roller 33; only after this initial displacement of the tool 37 do the ends 200A of the fork 200 enter subsequent into contact with the step 38A of the tool 38, so that the subsequent sliding of the fork causes the simultaneous displacement of the two cutting tools 37, 38. The effect of this is that when the tools 37, 38 are displaced laterally to the machine in order to be collected in a storage zone—which may be situated on the left or on the right of the front of the machine—the blades 37L and 38L of the two tools 37 and 38 are mutually spaced by an amount equal to the distance which they normally assume before their approach for the cutting operations (which approach is obtained by the axial displacement of the shaft 123) plus the distance in the direction of the axis of the support rollers 32 and 33 of the step 38A and of the front surface 37B of the two tools 38 and 37 respectively. When both cutting tools and creasing tools fitted on those rollers which are currently inactive are to be positioned in order to process the subsequent order, the first operation performed by the forks 200 and 200' s is a translatory movement of all the tools fitted on the inactive rollers towards a storage zone which will be situated at one or other end of said rollers. In the storage zone, the cuttng tools will be positioned with the steps 38A and the surfaces 37B of each pair of tools 37, 38 aligned, while the opposite front surfaces, designated 37C and 38C respectively, will be positioned offset along the axial direction of the rollers by an amount equivalent to the offset between the surface 37B and the step 38A in the attitude shown in FIG. 7A. In this manner, all contact between the blades 37L, 38L of the cutting tools is avoided. When the cutting tools are subsequently to be positioned along the respective cutting rollers by the fork 200 (or by the fork 200'), the points 200A of said fork act on the front surfaces 37C and 38C of each pair of tools 37, 38; since, in the storage position, these two surfaces 37C, 38C are offset, the surface 37C being farther from the machine centre, the interaction wth the ends 200A of the fork first causes an advance of the single tool 37 by an amount again equivalent to the initial offset of the surfacs 37C and 38C, and subsequently a simultaneous advance of the two tools 37 and 38. The effect of this is that the blades 37L and 38L, which were mutually separated in the storage position, are brought together again during the maneuver of positioning the tools in the new attitude. It is apparent that only the blades 37L and 38L of the tools which are to be used will be close together, while all the blades of the tools 37, 38 which remain in the storage zone will be mutually separated, and will remain so in the processing of the subseqent order, so that, in the case of these inactive tools, there is no contact between the blades and hence no wear on the cutting tools. As stated, storage for the tools can be provided on the left or on the right of the respective roller; however, it is also possible to provide double storage of tools at both ends of the roller. In this case, the tools may have a symmetrical configuration relative to a central plane.

As mentioned above, the cutting pressure between the blades 37L and 38L is imposed by means of the cylinder/piston actuator 139; in order to permit correct functioning of the blades 37L and 38L, which are close together, one of said blades is mounted rigidly on the respective tool while the other is mounted with the interposition of a resilient member 37D. The axial displacement in the direction f123 imposed by the actuator 137, 139 resiliently compresses the resilient member 37D, which then exerts a cutting pressure between the blades 37L, 38L, Particularly in the exemplary embodiment shown in FIG. 7A, the blade 38L is mounted ridigly the tool 38, while the blade 38L is mounted on the tool 37 with the interposition of a resilient ring 37D of rubber or the like.

In several applications, it is desirable to have the possibility of performing creasing lines in different positions and according to different patterns. In some cases, the number of creasing tools supported by the two pairs of creasing rollers 21, 22, 24, 25 could be insufficient. In this case, it may be provided that two machines having the same structure of the above described machine be placed in series. The first machine has four pairs of creasing rollers, while the second machine is exactly equal to the machine of FIG. 5. In such a case, the first machine has the same structure as the one of FIG. 5. with the only difference that also rollers 32, 33 and 34. 35 support creasing tools instead of cutting tools. The structure of the eight creasing rollers will be that shown in FIG. 6. Two carriages as those shown in FIGS. 10 and 11 will be provided above and below the center of the machine, for positioning the creasing tools. In operation the web of cardboard passes through two subseqent pairs of creasing rollers of the first machine. One f the two pairs of creasing rollers may be inoperative. that is to say with the creasing tools spaced apart.

In such a configuration, the first machine will be able to perform only creasing lines, while the second machine will be able to perform creasing and cutting of the web of cardboard. The cutting could be performed also with a machine having a different structure.

Figure 16:
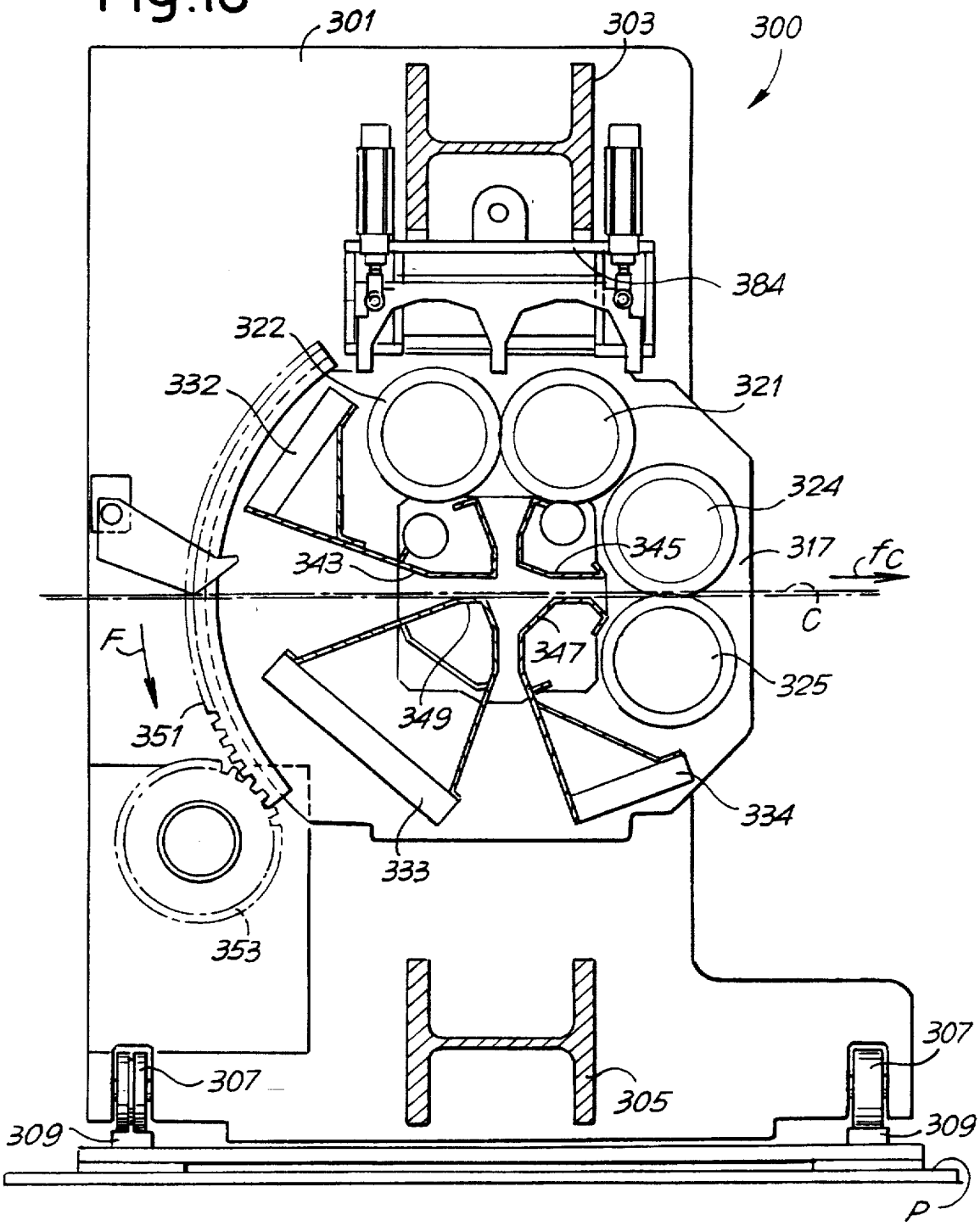
FIGS. 16 to 18 show a machine which may be combined to the machine of the preceding figures, to perform creasing lines.
Figure 17:
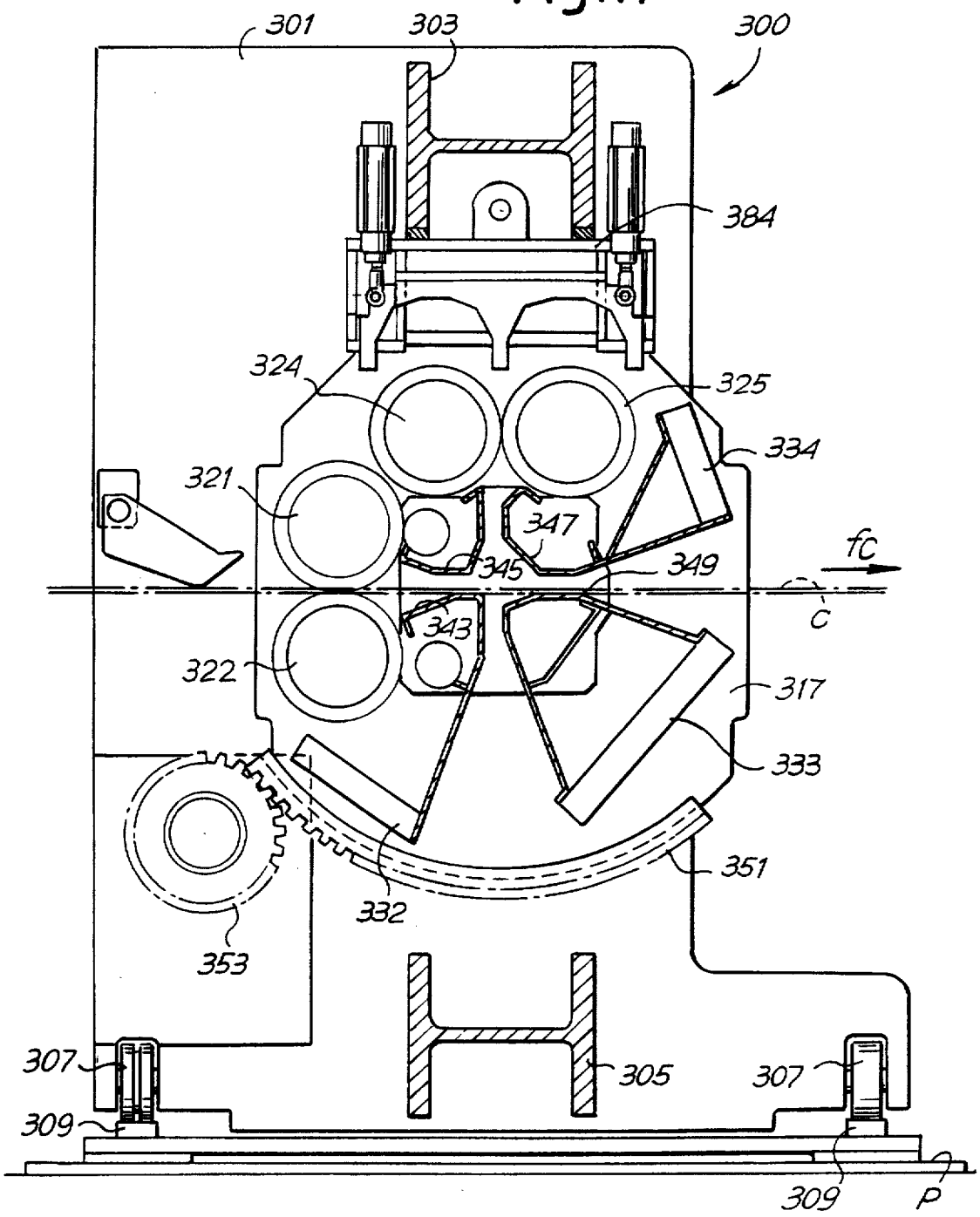
Figure 18:
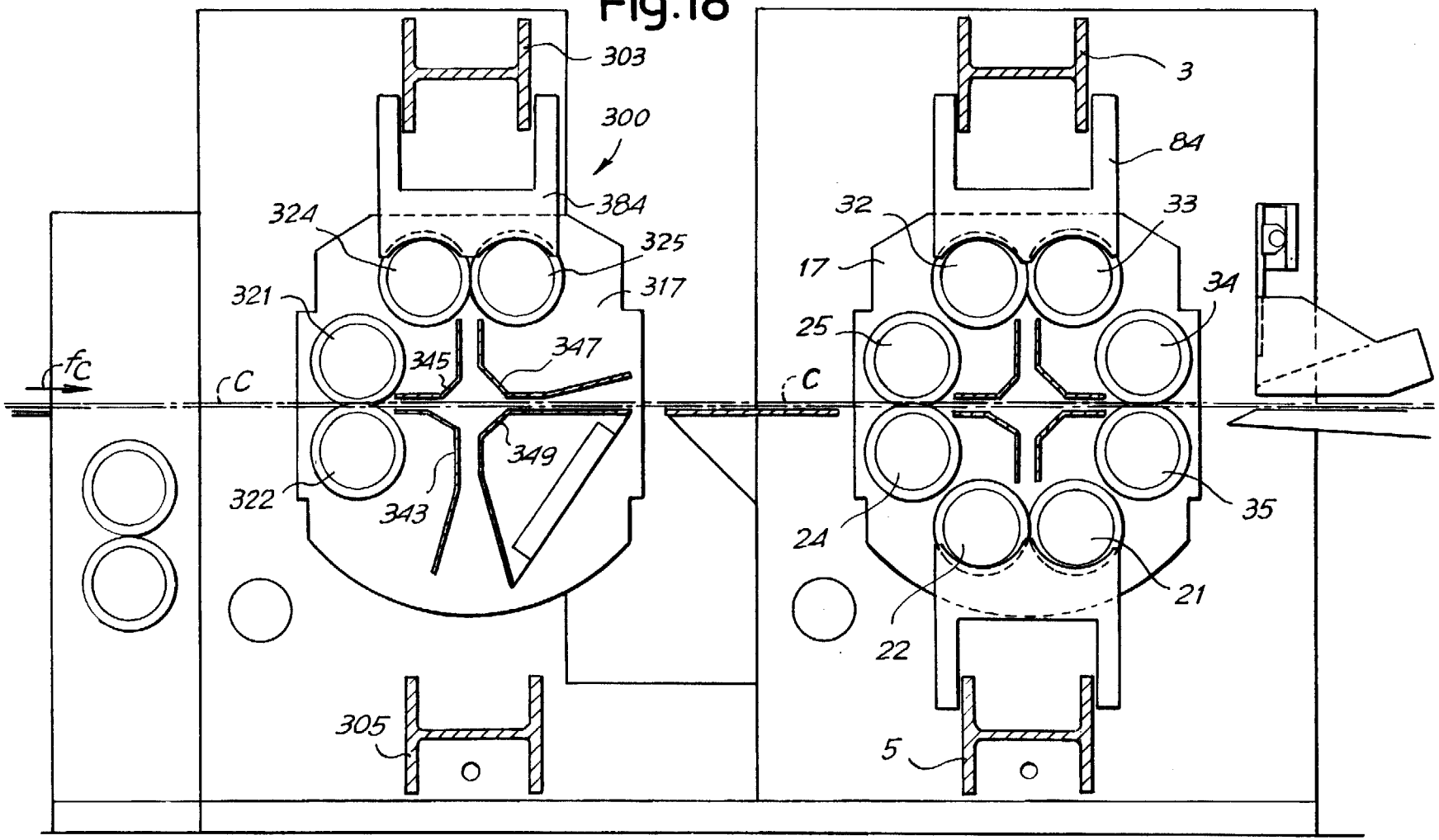

FIGS. 16 and 17 show a machine for creasing an endless web of cardboard, which has a structure similar to the above described machine. The machine of FIGS. 16 and 17 can be placed in series with the machine of FIGS. 1 to 15, as shown in FIG. 18. The machine of FIGS. 16 and 17, generally indicated by 300, has a bearing structure produced by means of a pair of lateral uprights 301 mutually connected by upper and lower cross pieces 303 and 305. This structure is equipped with wheels 307 which roll on corresponding tracks 309 anchored to the floor P. The structure is combined to a reducing motor similar to motor 13, which is capable of imparting to said structure transverse movements, in order to follow any transverse tiltings and movements of the cardboard being processed.

The structure formed by the uprights 301 and by the cross pieces 303 and 305 carries an assembly which is capable of oscillatng about an axis which is transverse relatively to the direction of advancement of the cardboard fed to the machine. This assembly carries two pairs of shafts on which are mounted the creasing tools. More specifically, as shown diagrammatically in FIGS. 16 and 17, the oscillating assembly is formed by a pair of mobile side pieces 317 parallel to the uprights 301, and carried by supports, like those shown in FIG. 9. The mobile pieces 317 carry two pairs of rollers 321, 322 and 324, 325 respectively, on which are fitted creasing tools, like the tools 27, 28, 29, 30 already described.

The two pairs of rollers 321, 322 and 324, 325 respectively are mutually adjacent and are arranged in a manner such that the planes defined by the axes of the rollers 321, 322 and of the rollers 324, 325 respectively are mutually perpendicular. Counterweights 332, 333 and 334 are provided solid to the assembly formed by the side pieces 17, which are able to balance the weight of rollers, 321, 322, 324, 325 with respect to the support axis.

As is apparent from the schematic drawings of FIGS. 16 and 17, during operation the cardboard C passes in the direction of the arrow fC between one of the two pairs of rollers carrying the creasing tools. More specifically, in FIG. 16 the cardboard passes between the pair of rollers 324, 325. Between the zone defined by the rollers 321, 322, 324, 325 and the counterweights 332, 333, 334 are disposed profiles 343, 345, 347 and 349 defining two passages which are mutually inclined at an angle of 90° for the passage of the cardboard C. In the attitude shown in FIG. 16, the cardboard passes over the profiles 347 and 349. When the position of the creasing rollers is rotated through 90° to assume the attitude of FIG. 17, the cardboard C passes between the rollers 321 and 322 and over the profiles 343 and 349. This second position is obtained by rotation in the direction of arrow F of the entire group comprising the rollers 321, 322, 324, 325, the profiles 343, 345, 347, 349 and the mobile side pieces 317. In order to obtain the rotation of this group, there is fixed to each mobile side pieces 317 a toothed wheel sector designated 351 which engages with a corresponding pinion 353 that transmits an oscillating rotary movement obtained from control means similar to those described with reference to FIG. 12.

The creasing rolles 321, 322 and 324, 325 are supported to the side pieces 317 in the same way as shown in FIG. 6 for rolles 21 and 22. They are set to rotate by means of a toothed belt which takes the motion from a central pulley as above described with reference to FIGS. 5 and 9. There may be provided two motors, one on each side of the machine, for each pair of rollers 321, 322 and 324, 325, as already described above. Alternatively, there may be provided a single motor provided with a clutch in order to put into rotation alternatively the first of the second pair of rollers.

FIG. 18 shows a working line in which the cardboard C passes through a machine 300 of the kind described with reference to FIGS. 16 and 17, and through a machine for creasing and cutting of the kind described with reference to FIGS. 1 to 15. This arrangement allows a large number of creasing tools to be used and selected for different orders to be processed.

While specific embodiments of the invention have been shown and described in detail to illustrate the application of the principles of the invention, it will be understood that the invention may be embodies otherwise without departing from such principles.

I claim:

1. An apparatus for creasing and cutting a web of cardboard, the apparatus comprising:

first and second pairs of creasing rollers;

first and second pairs of cutting rollers;

oscillating rotary means for holding in position said first and second pairs of said creasing and cutting rollers, said oscillating rotary means rotating into one of a first and second angular positions, said first angular position positioning said first pairs of said creasing and said cutting rollers into a working position, and positioning said second pairs of said creasing and cutting rollers into an inactive position, said second angular position positioning said first pairs of said creasing and said cutting rollers into an inactive position and positioning said second pairs of said creasing and cutting rollers into said working position, said first pair of creasing rollers is held opposite said [second] *first* pair of [creasing] *cutting* rollers relative to an axis of rotation of said oscillating rotary means, said [first] *second* pair of cutting rollers is held opposite said second pair of [cutting] *creasing* rollers relative to said axis of rotation of said oscillating rotary means;

tool position means for positioning creasing and cutting tools on said creasing and cutting rollers, when said creasing and cutting rollers are in said inactive positions; and roller transmission means for together rolling said first pair of creasing and cutting rollers and for together rolling said second pair of creasing and cutting rollers independently of said first pair, said roller transmission means rolling said rollers independently of said working and inactive positions of said first and second pairs of creasing and cutting rollers.

2. An apparatus in accordance with claim 1, wherein:

said oscillating rotary means has side pieces with a bearing structure for said rotating, said side pieces having tools wheel sectors, said oscillating rotary means also having pinion means for engaging with said tooth wheel sectors and for forcing said rotator.

3. An apparatus in accordance with claim 2, wherein:

said oscillating rotary means has an intermittor means for rotating siad oscillating rotary means in a smooth, fast and accurate manner between said first and second annular positions;

4. An apparatus in accordance with claim 2, wherein:

one of said cutting rollers is axially movable in order to bring together and move apart said cutting tools.

5. An apparatus in accordance with claim 4, wherein:

said one cutting rollers is mounted in a angularly mobile seating, said angularly mobile seating being equipped with a thread;

said side pieces having a corresponding thread interacting with said thread on said seating of said cutting roller; and actuator means for angularly oscillating said seating of said cutting roller for controlling axial movement of said one cutting roller.

6. An apparatus in accordance with claim 2, further comprising:

supports on said side pieces for mounting said cutting rollers, said supports being openable to remove and replace said cutting rollers.

7. An apparatus in accordance with claim 6, further comprising:

a support means for supporting said cutting rollers during said opening of said supports.

8. An apparatus in accordance with claim 1, wherein:

said rotary transmission means has a first part and a second part, said first part mounted on a first side of the apparatus and connected to said first pairs of creasing and cutting rollers, said second part substantially similar to said first part and mounted on a second side of the apparatus, said second part being connected to said second pairs of creasing and cutting rollers, said first part and said second part operating said first and second pairs of creasing and cutting rollers independent of said working and inactive positions of said oscillating rotary means.

9. An apparatus in accordance with claim 8, wherein:

each of said first and second part of said rotary transmission means has a central pulle and a flexible transmission means for said connection to respective said pairs of creasing and cutting rollers.

10. An apparatus in accordance with claim 1, further comprising profiles between said first and second pairs of creasing and cutting rollers, said profiles having support and sliding surfaces and defining two alternate conveying paths for the flat material.

11. An apparatus in accordance with claim 1, wherein:

each of said pairs of creasing rollers may be brought together and moved apart in order to regulate creasing pressure.

12. An apparatus in accordance with claim 11, wherein:

one of said rollers of said each pair of creasing rollers is angularly movable about an axis parallel to the axis of said one roller in order for said bringing together and moving apart.

13. An apparatus in accordance with claim 12, wherein:

said one of said creasing roller is accommodated in eccentric seatings and said eccentric seatings are capable of rotating in order to cause said angular movement.

14. An apparatus in accordance wth claim 1, wherein:

one of said cutting tools is mounted resiliently on one of said cutting rollers.

15. An apparatus in accordance with claim 1, wherein:

said tool position means has a fork means for simultaneous displacement of one of said creasing and cutting tools.

* * * * *